US009221027B2

(12) United States Patent
Kuppler et al.

(10) Patent No.: US 9,221,027 B2
(45) Date of Patent: Dec. 29, 2015

(54) CURING SYSTEMS FOR MATERIALS THAT CONSUME CARBON DIOXIDE AND METHOD OF USE THEREOF

(71) Applicant: Solidia Technologies, Inc., Piscataway, NJ (US)

(72) Inventors: John P. Kuppler, Greenbrook, NJ (US); Vahit Atakan, West Windsor, NJ (US); Kenneth Smith, Flemington, NJ (US); Xudong Hu, Plainsboro, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 57 days.

(21) Appl. No.: 14/209,238

(22) Filed: Mar. 13, 2014

(65) Prior Publication Data
US 2014/0322083 A1 Oct. 30, 2014

Related U.S. Application Data

(60) Provisional application No. 61/785,226, filed on Mar. 14, 2013.

(51) Int. Cl.
| | |
|---|---|
| *F26B 21/08* | (2006.01) |
| *B01J 10/00* | (2006.01) |
| *C04B 40/02* | (2006.01) |
| *B28B 11/24* | (2006.01) |
| *C04B 28/18* | (2006.01) |

(Continued)

(52) U.S. Cl.
CPC ............. *B01J 10/005* (2013.01); *B28B 11/245* (2013.01); *B28B 11/247* (2013.01); *C04B 28/188* (2013.01); *C04B 40/02* (2013.01); *C04B 40/0231* (2013.01); *F27B 1/00* (2013.01); *F27B 5/04* (2013.01)

(58) Field of Classification Search
CPC .......... F26B 13/00; F26B 13/10; F26B 21/00; F26B 21/06; F26B 21/08; B01J 10/00; B01J 10/005; C04B 35/64; C04B 35/22; B28B 3/00; B28B 1/08; B28B 3/20
USPC ........... 34/527, 528, 531, 535, 548, 557, 558, 34/567; 422/109; 264/638, 646
See application file for complete search history.

(56) References Cited

U.S. PATENT DOCUMENTS

| 4,117,059 A * | 9/1978 | Murray ........................... 264/82 |
| 4,436,498 A * | 3/1984 | Murray ........................... 425/73 |

(Continued)

FOREIGN PATENT DOCUMENTS

| DE | 19646991 A1 * | 5/1998 | ............ A01M 13/00 |
| EP | 2092831 A1 * | 8/2009 | ............ A23B 7/148 |

(Continued)

*Primary Examiner* — Stephen M Gravini
(74) *Attorney, Agent, or Firm* — Milstein Zhang & Wu LLC; Joseph B. Milstein

(57) ABSTRACT

The invention provides a curing system that is useful for curing materials that consume carbon dioxide as a reagent. The system has a curing chamber that contains the material to be cured and a gas that contains carbon dioxide. The system includes apparatus that can deliver carbon dioxide to displace ambient air upon loading the system, that can provide carbon dioxide as it is needed and as it is consumed, that can control carbon dioxide concentration, temperature and humidity in the curing chamber during the curing cycle and that can record and display to a user the variables that occur during the curing process.

20 Claims, 22 Drawing Sheets

(51) Int. Cl.
    *F27B 1/00*     (2006.01)
    *F27B 5/04*     (2006.01)

(56) References Cited

U.S. PATENT DOCUMENTS

| | | | | |
|---|---|---|---|---|
| 5,089,198 | A | * | 2/1992 | Leach .............................. 264/82 |
| 5,694,701 | A | * | 12/1997 | Huelsman et al. .............. 34/421 |
| 5,935,317 | A | * | 8/1999 | Soroushian et al. .......... 106/723 |
| 6,065,224 | A | * | 5/2000 | Eigner ............................ 34/322 |
| 6,308,436 | B1 | * | 10/2001 | Stipp .............................. 34/422 |
| 7,225,561 | B2 | * | 6/2007 | Louw et al. .................... 34/310 |
| 7,272,895 | B2 | * | 9/2007 | La Gioia ......................... 34/90 |
| 7,363,729 | B2 | * | 4/2008 | Tanaka et al. .................. 34/418 |
| 7,877,895 | B2 | * | 2/2011 | Otsuka et al. .................... 34/78 |
| 8,096,064 | B2 | * | 1/2012 | Matsunaga et al. ............. 34/396 |
| 8,407,912 | B2 | * | 4/2013 | Hubbard et al. .................. 34/82 |
| 8,499,471 | B2 | * | 8/2013 | Coronella et al. .............. 34/381 |
| 8,845,940 | B2 | * | 9/2014 | Niven et al. ..................... 264/82 |
| 8,898,927 | B2 | * | 12/2014 | Shan et al. ...................... 34/282 |
| 2014/0322083 | A1 | * | 10/2014 | Kuppler et al. ............... 422/109 |
| 2014/0361471 | A1 | * | 12/2014 | Hu et al. ....................... 264/638 |

FOREIGN PATENT DOCUMENTS

| | | | | |
|---|---|---|---|---|
| GB | 2396209 | A | * | 6/2004 ............... F24F 11/00 |
| JP | 05093529 | A | * | 4/1993 ................ F24F 3/00 |
| WO | WO 2007131989 | A2 | * | 11/2007 |
| WO | WO 2014036777 | A1 | * | 3/2014 |
| WO | WO 2014160168 | A1 | * | 10/2014 |

* cited by examiner

FIG. 20

CURING SYSTEMS FOR MATERIALS THAT CONSUME CARBON DIOXIDE AND METHOD OF USE THEREOF

CROSS-REFERENCE TO RELATED APPLICATIONS

This application claims priority to and the benefit of U.S. provisional patent application Ser. No. 61/785,226, filed Mar. 14, 2013, which application is incorporated herein by reference in its entirety.

FIELD OF THE INVENTION

The invention generally relates to systems and methods for preparing novel composite materials. More particularly, the invention relates to equipment and methods used for making synthetic materials from a variety of commonly available raw (or precursor) materials including water and carbon dioxide. These composite materials are suitable for a variety of uses in construction, infrastructure, art and decoration.

BACKGROUND OF THE INVENTION

Concrete and Stone Materials

Humans have known and used concrete and stone since ancient times. For example, materials such as concrete, slate, granite and marble are used in constructing various useful structures.

Concrete has been used for all manner of structures, including roads, buildings and building components such as pipe, block, pavers, and railroad ties. Concrete has many beneficial properties such as being hard (or resistant to deformation by mechanical forces), fireproof, water repellent, and resistant to the elements including resistance to mold growth and fungus growth.

Slate is a fine grained, metamorphic rock composed primarily of quartz and mica (sometimes formulated as $KAl_2(AlSi_3O_{10})$). Because slate is planar, hard, fireproof, water repellent, and resistant to the elements including resistance to mold growth and fungus growth, it finds broad uses in building and construction, such as paver and roofing materials. Slate occurs in a variety of colors, for example, grey (pale to dark), green, cyan (bluish-green) or purple colors. Slate is generally "foliated", or layered, such that it cleaves to give distinctive, planar surface patterns. Its unique aesthetic and physical qualities have made slate a desirable material in building and construction as well as in decorative art and sculpture.

Artificial slate-like materials have been studied in efforts to replace the more expensive and scarce natural slate with low-cost, readily produced mimics. Such efforts, however, have yet to produce in a synthetic material that possesses the desired appearance, texture, density, hardness, porosity and other aesthetics characteristic of slate while at the same can be manufactured in large quantities at low cost with minimal environmental impact.

"Composite slate" is a simulated slate replacement made from recycled rubber and plastic. While these products resemble slate in appearance and in some properties (primarily that they are water repellent and resist the elements), they lack slate's hardness, they are not fireproof to the extent that slate is fireproof, and they have a distinctly different "feel". Up close, they look different. Finally, although they may contain recycled materials, they are based on materials derived from petrochemical products.

Laminated asphalt sheets have the artificial look that has made them considerably less desirable than the natural slate. Other artificial slate mimics are prepared with a synthetic resin binder. These methods suffer from a number of deficiencies, including poor reproducibility, low yield, deterioration, high finishing costs, unsatisfactory mechanical properties, and the like.

Granite is an igneous rock comprising principally quartz, mica and feldspar. It usually has coarse grains within a fine-grained matrix. It is known to occur in nature with various coloration.

Humans have known and used granite since ancient times. Its unique aesthetic and physical qualities have made granite a desirable material in building and construction as well as in decorative art and sculpture. Artificial granite-like materials have been studied in efforts to replace the expensive and scarce material with low-cost, readily produced mimics. Such efforts, however, have yet to produce in a synthetic material that possesses the desired appearance, texture, density, hardness, porosity and other aesthetics characteristic of granite while at the same can be manufactured in large quantities at low cost with minimal environmental impact.

Most artificial granite mimics are prepared by blending natural stone powder and minerals with a synthetic resin (e.g., acrylic, unsaturated polyester, epoxy). These methods suffer from a number of deficiencies, including poor reproducibility, low yield, deterioration, high finishing costs, unsatisfactory mechanical properties, and the like.

Humans have known and used marble since ancient times. Its unique aesthetic and physical qualities have made marble a desirable material in building and construction as well as in decorative art and sculpture. Artificial marble-like materials have been studied in efforts to replace the expensive and scarce material with low-cost, readily produced mimics. Such efforts, however, have yet to produce in a synthetic material that possesses the desired appearance, texture, density, hardness, porosity and other aesthetics characteristic of marble while at the same can be manufactured in large quantities at low cost with minimal environmental impact.

Most artificial marble mimics are prepared by blending natural stone powder and minerals with a synthetic resin (e.g., acrylic, unsaturated polyester, epoxy). These methods suffer from a number of deficiencies, including poor reproducibility, low yield, high finishing costs, deterioration, unsatisfactory mechanical properties, and the like.

Conventional Concrete Curing Chambers

Traditional concrete curing chambers are employed in a variety of precast concrete industries. A curing chamber is a fully or partially enclosed volume within which a controlled environment can be created. The enclosed volume may defined by the solid walls of a rigid structure such as a room or by a flexible barrier such as a tarp in the form of a tent. After a concrete specimen is formed, it is placed in a controlled environment with sufficient moisture content and high enough temperature to ensure that adequate curing is reached in reasonable times, typically measured in days. Curing is vital to the quality of the concrete products and has a strong influence on properties such as durability, strength and abrasion resistance. Proper curing also aids to mitigate secondary reactions that occur over time that may cause defects and unwanted color changes of the finished products.

Curing of concrete aids the chemical reaction of Portland cement concrete known as hydration. The chamber is intended to keep the controlled environment conditioned and to maintain proper moisture within the product for the duration of the curing process. Any appreciable loss of moisture will significantly delay or prevent hydration and therefore decrease the properties of the product. Also, temperature plays a critical role during the curing process as temperatures below 10 C or above 70 C are highly unfavorable for curing while a temperature of 60 C is optimum.

Some companies that produce precast concrete attempt simplified curing processes using large rooms or areas covered by tarps which house the products in an attempt to maintain temperature and humidity. These systems may act as a means to retain heat generated from the samples as a result of the exothermic reaction that occurs during the hydration reaction or to retain heat or humidity that may be provided by external heaters or water spraying systems. The most efficient and effective method to cure precast concretes, however, relies on a permanent, sealed and controllable curing environment.

Several companies exist that specialize in the design, manufacturing, and installation of Portland cement concrete curing chambers for the precast industry in the production of a wide range of products included but not limited to paving stones, concrete masonry units (CMU's), retaining walls, and roofing tiles. These curing systems are most often constructed of steel, typically galvanized steel, and are insulated to prevent heat loss and maintain energy efficiency. Some systems are highly automated and include "finger cars" which are automated transfer systems that take the formed precast products from the former into the curing chamber racks. Commercial curing systems can range from the size of a standard shipping container (approximately 40 ft×10 ft×8 ft) all the way up to high volume production systems that could be as large as 200 ft λ 100 ft×50 ft. The chambers can be configured as one "Big Room" system if the product is consistent, but for manufacturers with many products lines a "Multi Lane" system is usually employed that allows for separate temperature and humidity profile control of each individual bay that may be home to a different product line.

FIG. 1 is a schematic diagram of a traditional (prior art) concrete curing chamber, including the primary components which are a circulation system, a heat exchanger, and a humidification system. The system may contain one or many blowers for gas circulation that provide high enough gas velocities across the products to allow for distribution of temperature and humidity as required. The heat exchanger can employ a direct gas fired burner, an indirect gas fired burner, or an electric heater. The humidification system usually includes atomizing spray nozzles or a heated vapor generator to provide water vapor to the system. Both temperature and humidity are monitored by sensors that send signals back to a computer or programmable logic controller that is used to control the curing parameters. Many systems allow for complete sequenced automation with temperature and humidity ramp up, dwell, and cool down steps such as are shown in FIG. 2 FIG. 2 is a graph that illustrates a traditional (prior art) concrete curing profile showing temperature as a function of time.

Treatment Systems Using Carbon Dioxide

Among the descriptions of systems that use carbon dioxide as a reactant are:

Kraft Energy, which describes their use in a number of documents such as Kraft Energy Concrete Curing Systems. Kraft Energy at page 195 states that carbonation (of concrete) is "[a] process by which carbon dioxide from the air penetrates the concrete and reacts with the hydroxides, such as calcium hydroxide, to form carbonates. In the reaction with calcium hydroxide, calcium carbonate is formed." At page 37, Kraft Energy shows an illustration of a paver stone that has been carbonated. The caption under the image states "Typical carbonation found after vapor curing a 7 N/mm2 solid block for 24 hours. (Phenolphthalein indication)." The image shows a rectangular block that has a grey region on its surfaces, and a purple center region. It is known that phenolphthalein is a chemical compound with the formula $C_{20}H_{14}O_4$. It turns colorless in acidic solutions and pink in basic solutions. If the concentration of indicator is particularly strong, it can appear purple. As is evident from the image, the carbonation only proceeds to a shallow depth and does not occur in the central portion of the block.

Also known in the prior art is Murray, U.S. Pat. No. 4,117,060, issued Sep. 26, 1978, which is said to disclose a method and apparatus is provided for the manufacture of products of concrete or like construction, in which a mixture of calcareous cementitious binder substance, such as cement, an aggregate, a vinyl acetatedibutyl maleate copolymer, and an amount of water sufficient to make a relatively dry mix is compressed into the desired configuration in a mold, and with the mixture being exposed to carbon dioxide gas in the mold, prior to the compression taking place, such that the carbon dioxide gas reacts with the ingredients to provide a hardened product in an accelerated state of cure having excellent physical properties.

Also known in the prior art is Malinowski, U.S. Pat. No. 4,362,679, issued Dec. 7, 1982, which is said to disclose a method of casting different types of concrete products without the need of using a curing chamber or an autoclave the concrete subsequent to mixing, is casted and externally and/or internally subjected to a vacuum treatment to have it de-watered and compacted. Then carbon-dioxide gas is supplied to the mass while maintaining a sub- or under-pressure in a manner such that the gas-as a result of the sub-pressure-diffuses into the capillaries formed in the concrete mass, to quickly harden the mass. In one embodiment (cf. FIG. 2)—in which the mass (I) is de-watered and compacted by means of a mat or plate (2) placed thereupon and exposed to a sub-pressure via a pipe or a line (5)—the carbon-dioxide gas is supplied (through line 6) via said mat or plate (2) while using the under-pressure prevailing in the mass. In another embodiment (cf. FIG. 3) the sub-pressure is applied (via line 5) from one or more sides (2b) of the mould to the interior of the element being cast, either by means of special inserts, by holes or cavities inside the element or via a porous material layer (Ib) in the inner portion thereof. Then the carbon-dioxide gas is supplied correspondingly (via line 6). These two main embodiments may in certain cases be combined in different ways. Further the concrete may at the same time or subsequently be subjected to another type of treatment such as impregnation by a suitable solution.

Also known in the prior art is Getson, U.S. Pat. No. 4,862,827, issued Sep. 5, 1989, which is said to disclose at column 3, lines 26-32, that "Referring to FIG. 1, there is shown air intake 33 and exhaust 37, with chamber 35 downstream of the air path from air intake 33. This chamber may be used for introducing carbon dioxide for accelerating and curing certain compositions and/or it may be used for introducing 30 additional moisture to further accelerate curing of moisture-curable systems."

Also known in the prior art is Charlebois, U.S. Pat. No. 5,800,752, issued Sep. 1, 1998, which is said to disclose polymer composite products, including products made of polymer concrete, reinforced polymer concrete and reinforced plastics, such as bulk:molding compound, sheet molding compound, mineral molding compound and advanced molding compound systems, are produced by the simultaneous application of vibration, heat and pressure to a mixture of filler and polymeric binder. The simultaneous application of vibration, heat and pressure provides a protective layer of polymerized binder that protects the surfaces of the mold and provides products that are substantially free of curling, cracking or voids. The process of the present invention substantially reduces the time required to cure polymer composite products.

Also known in the prior art is Soroushian et al., U.S. Pat. No. 5,935,317, issued Aug. 10, 1999, which is said to disclose a $CO_2$ pre-curing period is used prior to accelerated (steam or high-pressure steam) curing of cement and concrete products in order to: (1) prepare the products to withstand the high temperature and vapor pressure in the accelerated curing environment without microcracking and damage; and (2) incorporate the advantages of carbonation reactions in terms of dimensional stability, chemical stability, increased strength and hardness, and improved abrasion resistance into cement and concrete products without substantially modifying the conventional procedures of accelerated curing. Depending on the moisture content of the product, the invention may accomplish $CO_2$ pre-curing by first drying the product (e.g. at slightly elevated temperature) and then expose it to a carbon dioxide-rich environment. Vigorous reactions of cement paste in the presence of carbon dioxide provide the products with enhanced strength, integrity and chemical and dimensional stability in a relatively short time period. Subsequent accelerated curing, even at reduced time periods (with less energy and cost consumptions) would produce higher performance characteristics than achievable with the conventional pre-setting period followed by accelerated curing of cement and concrete products.

Also known in the prior art is Ramme et al., U.S. Pat. No. 7,390,444, issued Jun. 24, 2008, which is said to disclose a process for sequestering carbon dioxide from the flue gas emitted from a combustion chamber is disclosed. In the process, a foam including a foaming agent and the flue gas is formed, and the foam is added to a mixture including a cementitious material (e.g., fly ash) and water to form a foamed mixture. Thereafter, the foamed mixture is allowed to set, preferably to a controlled low-strength material having a compressive strength of 1200 psi or less. The carbon dioxide in the flue gas and waste heat reacts with hydration products in the controlled low-strength material to increase strength. In this process, the carbon dioxide is sequestered. The CLSM can be crushed or pelletized to form a lightweight aggregate with properties similar to the naturally occurring mineral, pumice.

Also known in the prior art is CARBONCURE TECHNOLOGIES INC., International Patent Application Publication No. WO 2012/079173 A1, published 21 Jun. 2012, which is said to disclose concrete articles, including blocks, substantially planar products (such as pavers) and hollow products (such as hollow pipes), are formed in a mold while carbon dioxide is injected into the concrete in the mold, through perforations.

All of the above documents that describe reactions of carbon dioxide with concrete are dealing with concrete that has Portland cement as a binding agent. Portland cement cures in the absence of $CO_2$ via a hydration reaction.

Furthermore, existing methods typically involve large energy consumption and carbon dioxide emission with unfavorable carbon footprint.

There is an on-going need for an apparatus and methods for fabricating novel composite materials that exhibit useful aesthetic and physical characteristics and can be mass-produced at low cost with improved energy consumption and desirable carbon footprint.

SUMMARY OF THE INVENTION

The invention is based in part on the unexpected discovery of novel composite materials such as concrete and stone-like materials that can be readily produced from widely available, low cost precursor materials in particle form by a process suitable for large-scale production. The precursor materials include bonding elements that comprise particulate calcium silicate (e.g., ground Wollastonite), and particulate filler materials that include minerals (e.g., quartz and other $SiO_2$-containing materials, granite, mica and feldspar). A fluid component is also provided as a reaction medium, comprising liquid water and/or water vapor and a reactant, carbon dioxide ($CO_2$). Additive materials can include natural or recycled materials, and calcium carbonate-rich and magnesium carbonate-rich materials, as well as additives to the fluid component, such as a water-soluble dispersant.

Various additives can be used to fine-tune the physical appearance and mechanical properties of the resulting composite material, such as particles of colored materials, such as colored glass, colored sand, and colored quartz particles, and pigments (e.g., black iron oxide, cobalt oxide and chromium oxide). One can use the term "colorants" to refer generally to either or both of colored materials and pigments. In order to simulate a slate-like appearance, the particulate filler materials can include coarse particles and fine particles. The coarse particles are principally Silicate based materials in order to provide hardness, and the fine particles can be a wide variety of materials, including sand, ground, crushed or otherwise comminuted substances selected from minerals and additive materials.

These composite materials may exhibit aesthetic visual patterns as well as display compressive strength, flexural strength and water absorption similar to that of the corresponding natural materials. The composite materials of the invention can be produced using the efficient gas-assisted hydrothermal liquid phase sintering (HLPS) process at low cost and with much improved energy consumption and carbon footprint. In fact, in preferred embodiments of the invention, $CO_2$ is consumed as a reactive species resulting in net sequestration of $CO_2$.

According to one aspect, the invention features a curing system for curing a material which requires $CO_2$ as a curing reagent. The material does not cure in the absence of $CO_2$. The material does not consume water as a reagent. The curing system comprises a curing chamber configured to contain a material that consumes $CO_2$ as a reactant (or reagent) and that does not cure in the absence of $CO_2$. The curing chamber having at least one port configured to allow the material to be introduced into the curing chamber and to be removed from the curing chamber, and having at least one closure for the port, the closure configured to provide an atmospheric seal when closed so as to prevent contamination of a gas present in the curing chamber by gas outside the curing chamber; a source of carbon dioxide configured to provide gaseous carbon dioxide to the curing chamber by way of a gas entry port in the curing chamber, the source of carbon dioxide having at least one flow regulation device configured to control a flow rate of the gaseous carbon dioxide into the curing chamber; a gas flow subsystem configured to circulate the gas through the curing chamber during a time period when the material that consumes $CO_2$ as a reactant is being cured; a temperature control subsystem configured to control a temperature of the gas within the chamber; a humidity control subsystem configured to control a humidity in the gas within the chamber to increase or decrease humidity; and at least one controller in communication with at least one of the source of carbon dioxide, the gas flow subsystem, the temperature control subsystem, and the humidity control subsystem; and at least one controller configured to control independently during a time period when the material that consumes $CO_2$ as a reactant is being cured at least a respective one of the flow rate of the gaseous carbon dioxide, the circulation of the gas through the curing chamber, the temperature of the gas, and the humidity in the gas.

In one embodiment, the curing chamber is configured to contain a pressure of gas therein that is above atmospheric pressure.

In another embodiment, the at least one flow regulation device comprises at least one of a pressure regulator and a flow controller configured to supply carbon dioxide gas at a rate substantially equal to a rate of consumption of the carbon dioxide by the material that consumes $CO_2$ as a reactant during curing.

In yet another embodiment, the at least one flow regulation device comprises at least one of a pressure regulator and a flow controller configured to supply carbon dioxide gas at a rate sufficient to purge ambient atmosphere from the curing chamber in a time period between 2-120 minutes to achieve a target $CO_2$ concentration in a range of 50-90% by volume.

In still another embodiment, the at least one flow regulation device comprises at least one of a pressure regulator and a flow controller configured to supply carbon dioxide gas at a rate substantially equal to a rate of venting of the gas from the curing chamber.

In a further embodiment, the gas flow subsystem includes a measurement apparatus configured to measure an amount of carbon dioxide in the gas present in the curing chamber.

In one embodiment, the gas flow subsystem includes a measurement apparatus configured to measure a gas velocity of the gas present in the curing chamber.

In one embodiment, the measurement apparatus configured to measure a gas velocity is a selected one of a pitot tube, an orifice plate, an anemometer and a laser Doppler detection system.

In one embodiment, the gas flow subsystem includes a variable speed blower configured to circulate gas at a desired velocity in the curing chamber.

In yet a further embodiment, the temperature control subsystem includes a temperature sensor configured to measure the temperature of the gas in the curing chamber.

In an additional embodiment, the temperature control subsystem includes a heat exchanger to regulate the temperature of the gas in the curing chamber.

In one more embodiment, the temperature control subsystem includes a heat exchanger to control a temperature of the gaseous carbon dioxide provided to the curing chamber by way of the gas entry port in the curing chamber.

In still a further embodiment, the temperature control subsystem includes a heater situated on an external surface of the curing chamber or built into the walls of the chamber.

In one embodiment, the humidity control subsystem includes a measurement apparatus configured to determine a relative humidity of the gas within the chamber.

In another embodiment, the humidity control subsystem includes a condenser and one-way water drain of condensate configured to reduce the humidity in the gas within the chamber.

In yet another embodiment, the humidity control subsystem includes an exhaust valve configured to reduce the humidity in the gas within the chamber.

In still another embodiment, the humidity control subsystem includes a water supply configured to increase the humidity in the gas within the chamber.

In a further embodiment, the at least one controller is a programmable logic controller.

In yet a further embodiment, the at least one controller is a general purpose programmable computer that operates under the control of a set of instructions recorded on a machine-readable medium.

In an additional embodiment, the at least one controller includes a display configured to display to a user any of a duration of a curing cycle, the flow rate of the gaseous carbon dioxide, a concentration of carbon dioxide in the curing chamber, a pressure of the gas in the curing chamber, a rate of circulation of the gas through the curing chamber, the temperature of the gas, and the humidity in the gas.

In one more embodiment, the at least one controller is configured to record any of a duration of a curing cycle, the flow rate of the gaseous carbon dioxide, a concentration of carbon dioxide in the curing chamber, a pressure of the gas in the curing chamber, a rate of circulation of the gas through the curing chamber, the temperature of the gas, and the humidity in the gas.

In still a further embodiment, the at least one controller includes a touch screen display.

BRIEF DESCRIPTION OF THE DRAWINGS

FIG. 20 is a screen shot of the display connected to a programmable logic controller that controls a curing chamber according to principles of the invention.

DETAILED DESCRIPTION OF THE INVENTION

Figure 1:
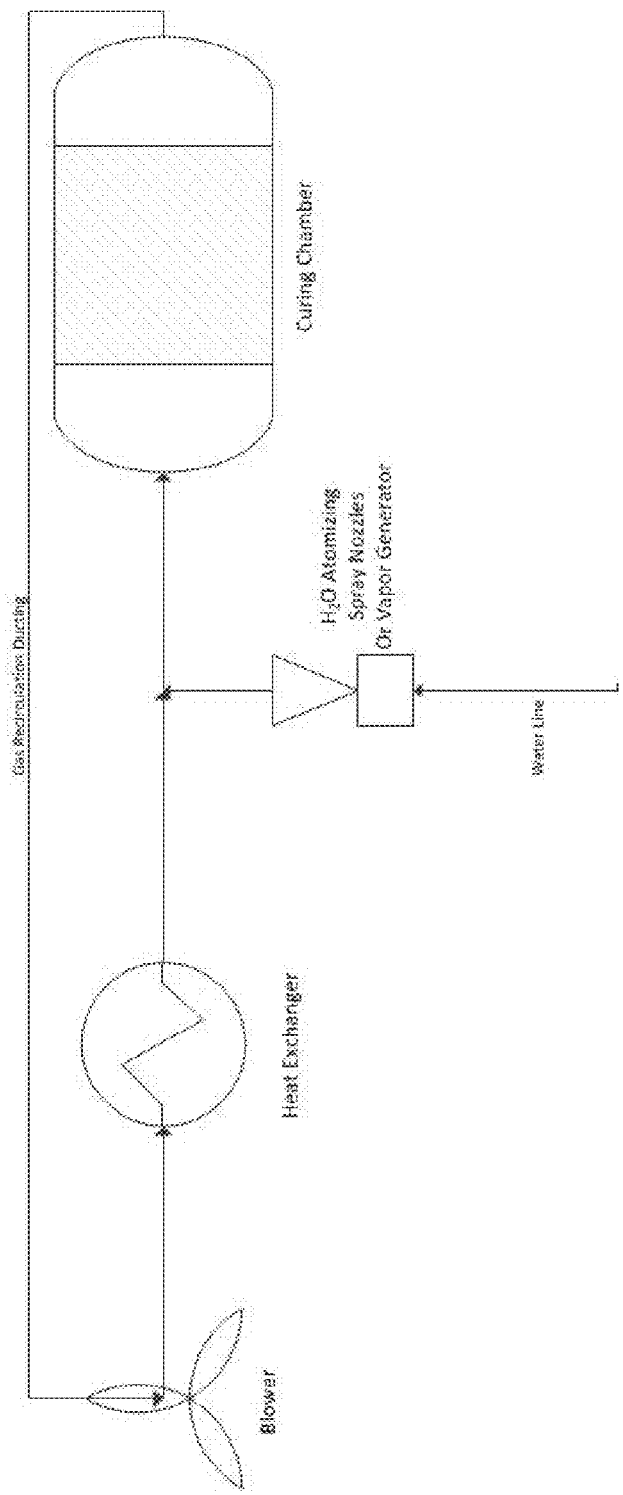
FIG. 1 is a schematic diagram of a traditional (prior art) concrete curing chamber.
Figure 2:
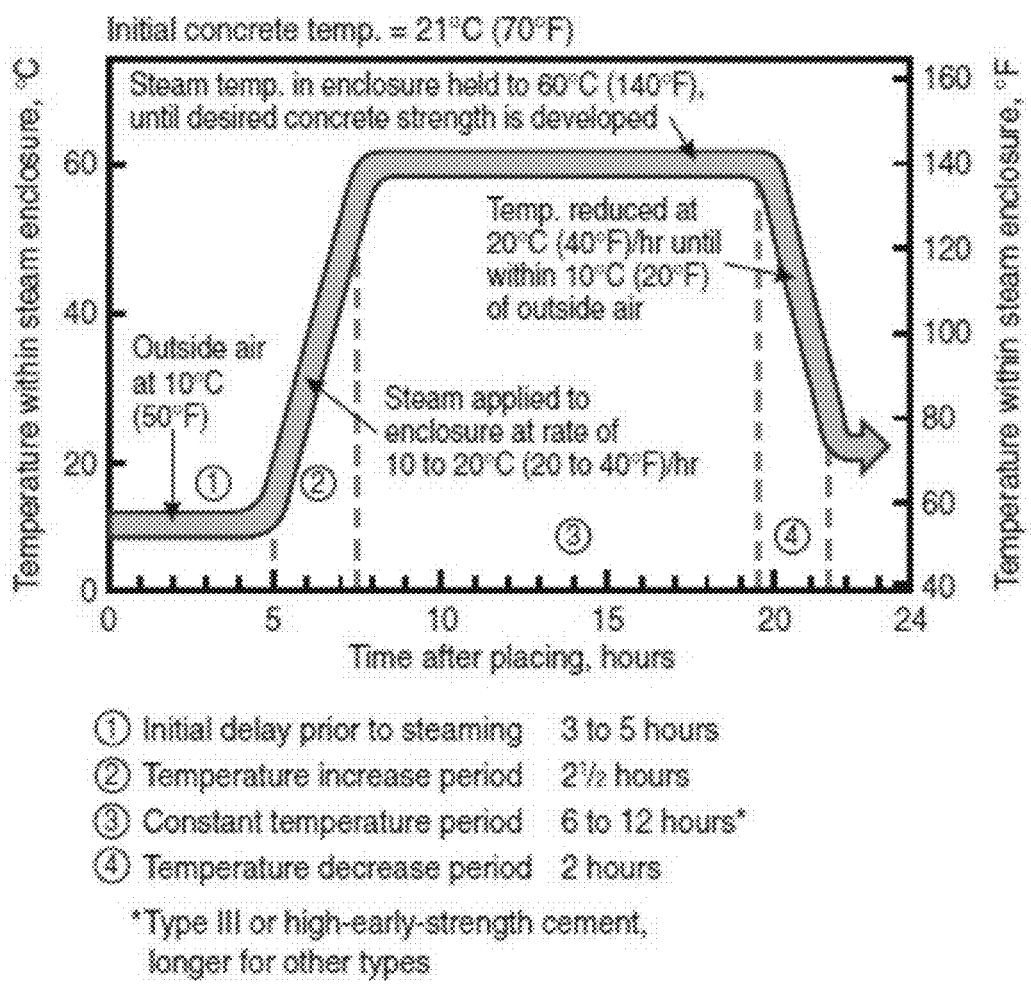
FIG. 2 is a graph that illustrates a traditional (prior art) concrete curing profile showing temperature as a function of time.

The essence of this invention is a curing system that creates a controlled atmosphere whereby temperature, pressure, CO₂ concentration, relative humidity and gas velocity are monitored and controlled to create final concrete-based products that will predominately cure in the presence of CO₂ and will not fully cure in the absence of CO₂.

Composite Materials Made by Hydrothermal Liquid Phase Sintering

This invention provides apparatus and methods used to manufacture novel composite materials that are cured predominantly by a CO₂ consumption reaction, that exhibit useful properties and can be readily produced from widely available, low cost precursor materials by a process suitable for large-scale production with minimal environmental impact. The precursor materials include inexpensive and abundant calcium silicate and calcium carbonate rich materials, for example, ground Wollastonite, ground limestone, coarse particles and fine particles. The coarse particles and the fine particles are principally $SiO_2$ based materials in order to provide hardness. The coarse and fine particles can include minerals (e.g., quartz and other $SiO_2$-bearing materials, granite, mica and feldspar). Other key process components include water and $CO_2$. Various additives can be used to modify and fine-tune the physical appearance and/or mechanical properties of the resulting composite material, such as using pigments (e.g., black iron oxide, cobalt oxide and chromium oxide) and colored glass and/or colored quartz.

These composite materials display various patterns, textures and other characteristics, such as visual patterns of various colors. In addition, the composite materials of the invention exhibit compressive strength, flexural strength and water absorption properties similar to conventional concrete or the corresponding natural materials. Furthermore, the composite materials can be produced, as disclosed herein, using the energy-efficient HLPS process and can be manufactured at low cost and with favorable environmental impact. For example in preferred embodiments of the invention, $CO_2$ is used as a reactive species resulting in sequestration of $CO_2$ in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions on various aspects of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 20090142578 (application Ser. No. 12/271,513), WO 2009/102360 (PCT/US2008/083606), WO 2011/053598 (PCT/US2010/054146), WO 2011/090967 (PCT/US2011/021623), U.S. application Ser. No. 13/411,218 filed Mar. 2, 2012 (Riman et al.), U.S. application Ser. No. 13/491,098 filed Jun. 7, 2012 (Riman et al), U.S. Provisional Patent Application No. 61/708,423 filed Oct. 1, 2012, and U.S. Provisional Patent Application Nos. 61/709,435, 61/709,453, 61/709,461, and 61/709,476, all filed Oct. 4, 2012, each of which is expressly incorporated herein by reference in its entirety for all purposes.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

The plurality of bonding elements may have any suitable median particle size and size distribution dependent on the desired composite material. In certain embodiments, the plurality of bonding elements have a median particle size in the range of about 5 μm to about 100 μm (e.g., about 5 μm to about 80 μm, about 5 μm to about 60 μm, about 5 μm to about 50 μm, about 5 μm to about 40 μm, about 5 μm to about 30 μm, about 5 μm to about 20 μm, about 5 μm to about 10 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

The plurality of filler particles may have any suitable median particle size and size distribution. In certain embodiments, the plurality of filler particles has a median particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

In certain preferred embodiments, the filler particles are made from a calcium carbonate-rich material such as limestone (e.g., ground limestone). In certain materials, the filler particles are made from one or more of SiO2-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

The plurality of bonding elements may be chemically transformed from any suitable precursor materials, for example, from a precursor calcium silicate other than wollastonite. The precursor calcium silicate may include one or more chemical elements of aluminum, magnesium and iron.

As used herein, the term "calcium silicate" refers to naturally-occurring minerals or synthetic materials that are comprised of one or more of a group of calcium-silicon-containing compounds including $CaSiO_3$ (also known as "Wollastonite" or "pseudo-wollastonite" and sometimes formulated as $CaO.SiO_2$), $Ca_3Si_2O_7$ (also known as "Rankinite" and sometimes formulated as $3CaO.2SiO_2$), $Ca_2SiO_4$ (also known as "Belite" and sometimes formulated as $2CaO.SiO_2$), $Ca_3SiO_5$ (also known as "Alite" and sometimes formulated as $3CaO.SiO_2$), which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more of a groups of magnesium-silicon-containing compounds including, for example, $Mg_2SiO_4$ (also known as "Fosterite") and $Mg_3Si_4O_{10}(OH)_2$ (also known as "Talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

The weight ratio of (bonding elements):(filler particles) may be any suitable rations dependent on the desired composite material, for example, in the range of about (15 to 50):about (50 to 85).

In certain preferred embodiments, the plurality of bonding elements are prepared by chemical transformation from ground wollastonite (or a non-wollastonite precursor calcium silicate or magnesium silicate) by reacting it with $CO_2$ via a gas-assisted HLPS process.

In certain embodiments, the composite material is characterized by a compressive strength from about 90 MPa to about 175 MPa (e.g., about 90 MPa to about 150 MPa, about 90 MPa to about 140 MPa, about 90 MPa to about 130 MPa, about 90 MPa to about 120 MPa, about 90 MPa to about 110 MPa, about 100 MPa to about 175 MPa, about 120 MPa to about 175 MPa, about 130 MPa to about 175 MPa, about 140 MPa to about 175 MPa, about 150 MPa to about 175 MPa, about 160 MPa to about 175 MPa).

In certain embodiments, the composite material is characterized by a flexural strength from about 5 MPa to about 30 MPa (e.g., about 5 MPa to about 25 MPa, about 5 MPa to about 20 MPa, about 5 MPa to about 15 MPa, about 5 MPa to about 10 MPa, about 10 MPa to about 30 MPa, about 20 MPa to about 30 MPa, about 25 MPa to about 30 MPa).

In certain embodiments, the composite material is characterized by water absorption of less than about 10% (e.g., less than about 8%, 5%, 4%, 3%, 2%, 1%).

In certain embodiments, the composite material has less than about 10% by weight of one or more minerals selected from quartz, mica, feldspar, calcium carbonate and magnesium carbonate.

The composite material may display any desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

In another aspect, the invention generally relates to a process for preparing a composite material. The process includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production; and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern.

The particulate composition includes a ground calcium silicate having a median particle size in the range from about 1 μm to about 100 μm, and a ground calcium carbonate or a $SiO_2$ bearing material having a median particle size in the range from about 3 μm to about 7 mm. The liquid composition includes water and a water-soluble dispersant.

In certain embodiments, the particulate composition further includes a second ground calcium carbonate having substantially smaller or larger median particle size than the first ground limestone. The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hours to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hours to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hours to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 to about 50 hours under a vapor comprising water and $CO_2$ and having an ambient atmospheric pressure.

In certain embodiments, the ground calcium silicate includes primarily ground Wollastonite, the first ground calcium carbonate includes primarily a first ground limestone, and the second ground calcium carbonate includes primarily a second ground limestone.

For example, in some embodiments, the ground Wollastonite has a median particle size from about 5 μm to about 50 μm (e.g., about 5 μm, 10 μm, 15 μm, 20 μm, 25 μm, 30 μm, 40 μm, 90 μm), a bulk density from about 0.6 g/mL to about 0.8 g/mL (loose) and about 1.0 g/mL to about 1.2 g/mL (tapped), a surface area from about 1.5 m²/g to about 2.0 m²/g. The first ground $SiO_2$ bearing material has a median particle size from about 40 μm to about 90 μm (e.g., about 40 μm, 50 μm, 60 μm, 70 μm, 80 μm, 30 μm, 90 μm), a bulk density from about 0.7 g/mL to about 0.9 g/mL (loose) and about 1.3 g/mL to about 1.6 g/mL (tapped).

In certain preferred embodiments, the liquid composition includes water and a water-soluble dispersant comprising a polymer salt (e.g., an acrylic homopolymer salt) having a concentration from about 0.1% to about 2% w/w of the liquid composition.

In yet another aspect, the invention generally relates to a composite material prepared according to a process disclosed herein, for example, a composite material having a compressive strength from about 90 MPa to about 175 MPa and a flexural strength from about 5.4 MPa to about 20.6 MPa.

In yet another aspect, the invention generally relates to an article of manufacture made from a composite material disclosed herein.

Any suitable precursor materials may be employed. For example calcium silicate particles formed primarily of Wollastonite, $CaSiO_3$, can react with carbon dioxide dissolved in water. It is believed that calcium cations are leached from the Wollastonite and transform the peripheral portion of the Wollastonite core into calcium-deficient Wollastonite. As the calcium cations continue to be leached from the peripheral portion of the core, the structure of the peripheral portion eventually become unstable and breaks down, thereby transforming the calcium-deficient Wollastonite peripheral portion of the core into a predominantly silica-rich first layer. Meanwhile, a predominantly calcium carbonate second layer precipitates from the water.

More specifically, the first layer and second layer may be formed from the precursor particle according the following reaction (1):

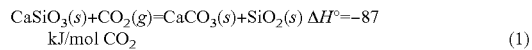

$$CaSiO_3(s)+CO_2(g)=CaCO_3(s)+SiO_2(s)\ \Delta H°=-87\ \text{kJ/mol}\ CO_2 \quad (1)$$

For example, in a silicate mineral carbonation reaction such as with Wollastonite, $CO_2$ is introduced as a gas phase that dissolves into an infiltration fluid, such as water. The dissolution of $CO_2$ forms acidic carbonic species that results in a decrease of pH in solution. The weakly acidic solution incongruently dissolves calcium species from $CaSiO_3$. The released calcium cations and the dissociated carbonate species lead to the precipitation of insoluble carbonates. Silica-rich layers are thought to remain on the mineral particles as calcium depleted layers.

Thus, according to a preferred embodiment of the invention, $CO_2$ preferentially reacts with the calcium cations of the Wollastonite precursor core, thereby transforming the peripheral portion of the precursor core into a silica-rich first layer and a calcium carbonate-rich second layer. Also, the presence of the first and second layers on the core act as a barrier to further reaction between Wollastonite and carbon dioxide, resulting in the bonding element having the core, first layer and second layer.

In some embodiments, silicate materials having metals other than Ca or in addition to Ca, for example Fosterite $(Mg_2SiO_4)$, Diopside $(CaMgSi_2O_6)$, and Talc $(Mg_3Si_4O_{10}(OH)_2)$ can react with carbon dioxide dissolved in water in a manner similar to the reaction of Wollastonite, as described above. It is believed that such silicate materials can be used, alone, in combination, and/or in combination with Wollastonite, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, 87$^{th}$ Edition 2006-2007, CRC.) This partially infiltrated state enables the reaction to proceed to a high degree of carbonation in a fixed period of time.

Liquid water in the pores speeds up the reaction rate because it is essential for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is delivered to the precursor materials in liquid form with $CO_2$ dissolved therein and the curing process is conducted at about 90° C. and about 20 psig (i.e., 20 psi above ambient pressure) for about 48 hours. In a second exemplary embodiment, water is present in the precursor material (e.g., as residual water from prior mixing step) and water vapor is provided to precursor materials (e.g., to maintain water level and/or prevent loss of water from evaporating) along with $CO_2$ and the curing process is performed at about 60° C. and 0 psig (at ambient atmospheric pressure) for about 19 hours. In a third exemplary embodiment, water is delivered to precursor materials in vapor form along with $CO_2$ and the curing process is performed at about 90° C. and 20 psig (20 psi above ambient atmospheric pressure) for about 19 hours.

In yet another aspect, the invention generally relates to a composite material that includes: a plurality of bonding elements and a plurality of filler particles. Each bonding element includes: a core comprising primarily magnesium silicate, a silica-rich first or inner layer, and a magnesium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties.

Compositions and methods disclosed herein in connection with calcium silicate can be adopted to use magnesium silicate in place of or in addition to calcium silicate.

B. Bonding Elements, Bonding Matrices and Composite Materials

B1. Bonding Elements

Figure 3:
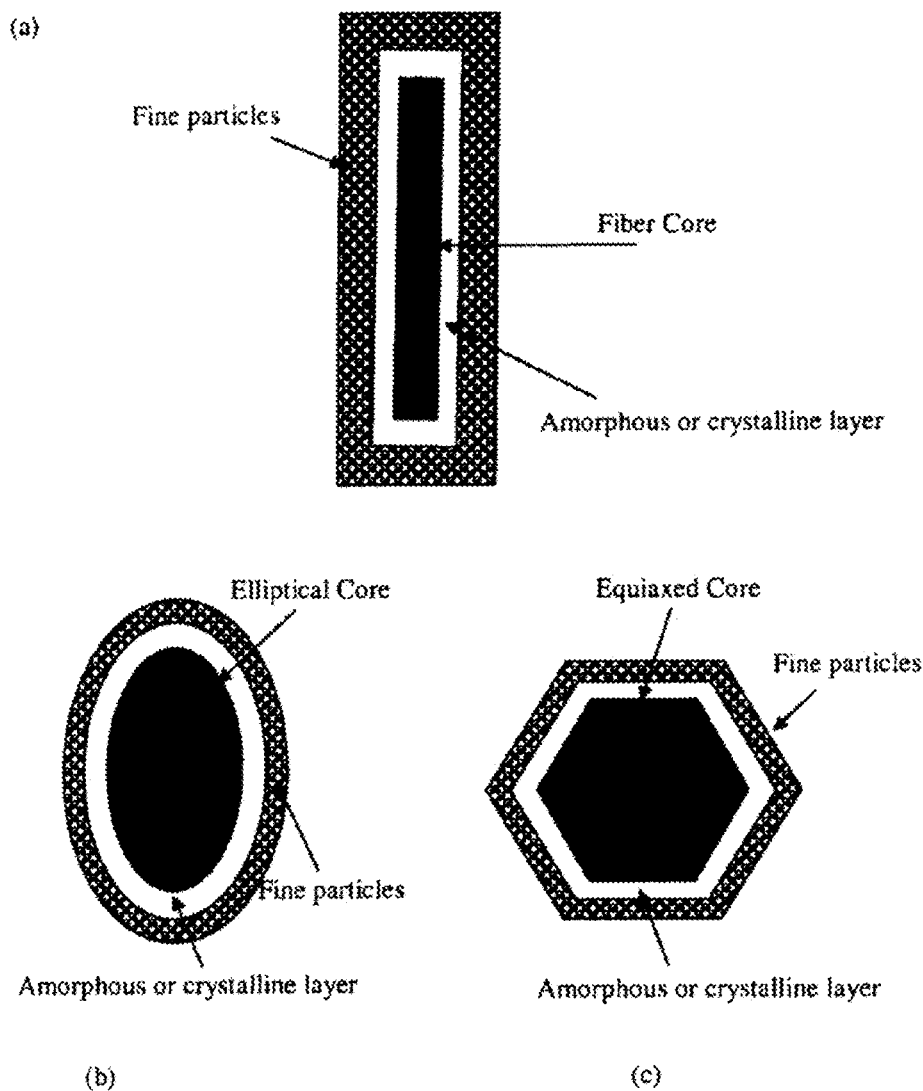
FIGS. 3(a)-3(c) are schematic illustrations of cross-sections of bonding elements according to exemplary embodiments of the present invention, including three exemplary core morphologies: (a) fibrous, (b) elliptical, and (c) equiaxed.

As schematically illustrated in FIGS. 3(a)-3(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Precursor particles can be selected from any suitable material that can undergo suitable transformation to form the desired bonding elements. For example, the precursor particles may include oxides and non-oxides of silicon, titanium, aluminum, phosphorus, vanadium, tungsten, molybdenum, gallium, manganese, zirconium, germanium, copper, niobium, cobalt, lead, iron, indium, arsenic, tantalum, and/or alkaline earth elements (beryllium, magnesium, calcium, strontium, barium and radium).

Exemplary precursor materials include oxides such as silicates, titanates, aluminates, phosphates, vanadates, tungstates, molybdates, gallates, manganates, zirconates, germinates, cuprates, stannates, hafnates, chromates, niobates, cobaltates, plumbates, ferrites, indates, arsenates, tantalates and combinations thereof. In some embodiments, the precursor particles include silicates such as orthosilicates, sorosilicates, cyclosilicates, inosilicates, phyllosilicates, tectosilicates and/or calcium silicate hydrate.

Certain waste materials may be used as the precursor particles for some applications. Waste materials may include, for example, minerals, industrial waste, or an industrial chemical material. Some exemplary waste materials include mineral silicate, iron ore, periclase, gypsum, iron (II) hydroxide, fly ash, bottom ash, slag, glass, oil shells, red mud, battery waste, recycled concrete, mine tailings, paper ash, or salts from concentrated reverse osmosis brine.

Additional precursor particles may include different types of rock containing minerals such as cal-silicate rock, fitch formation, hebron gneiss, layered gneiss, middle member, argillite, quartzite, intermediate Precambrian sediments, dark-colored, feldpathic quartzite with minor limestone beds, high-grade metasedimentry biotite schist, biotite gniss, mica schist, quartzite, hoosac formation, partridge formation, Washington gneiss, Devonian, Silurian greenvale cove formation, ocoee supergroup, metasandstone, metagraywacke, Rangeley formation, amphibolites, calcitic and dolomite marble, manhattan formation, rusty and gray biotite-quartz-feldspar gneiss, and waterford group.

Precursor particles may also include igneous rocks such as, andesite, anorthosite, basinite, boninite, carbonatite and charnockite, sedimentary materials such as, but not limited to, argillite, arkose, breccias, cataclasite, chalk, claystone, chert, flint, gitsone, lighine, limestone, mudstone, sandstone, shale, and siltsone, metamorphic materials such as, but not limited to, amphibolites, epidiorite, gneiss, granulite, greenstone, hornfels, marble, pelite, phyllite, quartzite, shist, skarn, slate, talc carbonate, and soapstone, and other varieties of rocks such as, but not limited to, adamellite, appinite, aphanites, borolanite, blue granite, epidosite, felsites, flint, ganister, ijolite, jadeitite, jasproid, kenyte, vogesite, larvikite, litchfieldite, luxullianite, mangerite, minette, novaculite, pyrolite, rapakivi granite, rhomb porphyry, shonkinite, taconite, teschenite, theralite, and variolite.

Table 1 provides exemplary embodiments of different types of chemistries for the first and second layers that can be achieved when using different precursor materials. Regarding the first layer, by using different precursor materials one may obtain silica, alumina or titania. The second layer may also be modified with the selection of the precursor material. For example, the second layer may include various types of carbonates such as, pure carbonates, multiple cations carbonates, carbonates with water or an OH group, layered carbonates with either water or an OH group, anion containing carbonates, silicate containing carbonates, and carbonate-bearing minerals.

TABLE 1

Exemplary Precursors and Encapsulating layers

| Raw Material (Precursor) | First Layer | Encapsulating Layer |
|---|---|---|
| Wollastonite ($CaSiO_3$) | Silica-rich | $CaCO_3$ |
| Fosterite ($Mg_2SiO_4$) | | $MgCO_3$ |

TABLE 1-continued

Exemplary Precursors and Encapsulating layers

| Raw Material (Precursor) | First Layer | Encapsulating Layer |
|---|---|---|
| Diopside ($CaMgSi_2O_6$) | | $(Ca,Mg)CO_3$ |
| Talc ($Mg_3Si_4O_{10}(OH)_2$) | | $MgCO_3 \cdot xH_2O$ (x = 1-5) |
| Glaucophane ($Na_2Mg_3Al_2Si_8O_{22}(OH)_2$) | Alumina and/or Silica-rich | $MgCO_3$ and/or $NaAlCO_3(OH)_2$ |
| Palygorskite (($Mg,Al)_2Si_4O_{10}(OH) \cdot 4(H_2O)$) | | $Mg_6Al_2CO_3(OH)_{16} \cdot 4H_2O$ |
| Meionite ($Ca_4(Al_2Si_2O_8)_3(Cl_2CO_3,SO_4)$) | | $Ca_2SO_4CO_3 \cdot 4H_2O$ |
| Tanzanite ($Ca_2Al_3O(SiO_4)(Si_2O_7)(OH)$) | | $Ca_5Si_2O_8CO_3$ and/or $Ca_5Si_2O_8CO_3$ and/or $Ca_7Si_6O_{18}CO_3 \cdot 2H_2O$ |
| ($Ba_{0.6}Sr_{0.3}Ca_{0.1})TiO_3$ | Titania-rich | $Sr(Sr,Ca,Ba)(CO_3)_2$ |

The second layer may be modified by introducing additional anions and/or cations. Such additional anions and cations may be used to modify the second layer to increase its physical and chemical properties such as fire resistance or acid resistance. For example, as shown in Table 2, while the first layer is retained as a silica-rich layer, the second layer may be modified by adding extra anions or cations to the reaction, such as $PO_4^{2-}$ and $SO_4^{2-}$. As a result, the second layer may include, for example, different phosphate, sulphate, fluoride or combinations thereof

TABLE 2

Examples of Cation/Anion Sources (in addition to $CO_3^{2-}$)

| Core Particle | First Layer | Extra anion/cation source | Encapsulating Layer | Carbonate Type |
|---|---|---|---|---|
| $CaSiO_3$ | Silica-rich layer | Phosphates | $Ca_5(PO_4,CO_3)_3OH$ | Phosphate bearing carbonates |
| | | Sulphates | $Ca_2SO_4CO_3 \cdot 4H_2O$ | Sulphate bearing carbonates |
| | | Fluorides | $Ca_2CO_3F_2$ | Fluorides bearing carbonates |
| | | Phosphates and fluorides | $Ca_5(PO_4,CO_3)_3F$ | Fluoride and phosphates bearing carbonates |
| | | $Mg^{+2}$ source like chlorides, nitrates, hydroxides etc. | $CaMg(CO_3)_2$ | Multiple cation carbonates |
| | | A combination of cation and anion sources | $Ca_6Mg_2(SO_4)_2(CO_3)_2Cl_4(OH)_4 \cdot 7H_2O$ | Post-1992 Carbonate-Bearing Minerals |

B2. Bonding Matrix and Composite Material

A bonding matrix comprises a plurality of bonding elements, forming a three-dimensional network. The bonding matrix may be porous or non-porous. The degree of porosity depends on a number of variables that can be used to control porosity, such as temperature, reactor design, the precursor material and the amount of liquid that is introduced during the transformation process. Depending on the intended application, the porosity can be set to almost any degree of porosity from about 1 vol. % to about 99 vol. %.

The bonding matrix may incorporate one or more filler materials, which are mixed with the precursor materials prior to or during the transformation process to create the composite material. The concentration of bonding elements in the bonding matrix may vary. For example, the concentration of bonding elements on a volume basis may be relatively high, wherein at least some of the bonding elements are in contact with one another. This situation may arise if filler material is incorporated into the bonding matrix, but the type of filler material and/or the amount of filler material is such that the level of volumetric dilution of the bonding element is relatively low. In another example, the concentration of bonding elements on a volume basis may be relatively low, wherein the bonding elements are more widely dispersed within the bonding matrix such that few, if any, of the bonding elements are in contact with one another. This situation may arise if filler material is incorporated into the bonding matrix, and the type of filler material and/or the amount of filler material is such that the level of dilution is relatively high.

In general, the filler material may include any one of a number of types of materials that can be incorporated into the bonding matrix. A filler material may be inert or active. An inert material does not go through any chemical reaction during the transformation and does not act as a nucleation site, although it may physically or mechanically interact with the bonding matrix. The inert material may involve polymers, metals, inorganic particles, aggregates, and the like. Specific examples may include, but are not limited to basalt, granite, recycled PVC, rubber, metal particles, alumina particle, zirconia particles, carbon-particles, carpet particles, Kevlar™ particles and combinations thereof. An active material chemically reacts with the bonding matrix during the transformation go through any chemical reaction during the transformation and/or acts as a nucleation site. For example, magnesium hydroxide may be used as a filler material and may chemically react with a dissolving calcium component phase from the bonding matrix to form magnesium calcium carbonate.

The bonding matrix may occupy almost any percentage of a composite material. Thus, for example, the bonding matrix may occupy about 1 vol. % to about 99 vol. % of the composite material (e.g., the volume fraction of the bonding matrix can be less than or equal to about 90 vol. %, 70 vol. %, 50 vol. %, 40 vol. %, 30 vol. %, 20 vol. %, 10 vol. %). A preferred range for the volume fraction of the bonding matrix is about 8 vol. % to about 90 vol. % (e.g., about 8 vol. % to about 80 vol. %, about 8 vol. % to about 70 vol. %, about 8 vol. % to about 50 vol. %, about 8 vol. % to about 40 vol. %), and more preferred range of about 8 vol. % to about 30 vol. %.

A composite material may also be porous or non-porous. The degree of porosity depends on a number of variables that can be used to control porosity, such as temperature, reactor design, the precursor material, the amount of liquid that is introduced during the transformation process and whether any filler is employed. Depending on the intended application, the porosity can be set to almost any degree of porosity from about 1 vol. % to about 99 vol. % (e.g., less than or equal to about 90 vol. %, 70 vol. %, 50 vol. %, 40 vol. %, 30 vol. %, 20 vol. %, 10 vol. %). A preferred range of porosity for the composite material is about 1 vol. % to about 70 vol. %, more preferably between about 1 vol. % and about 10 vol. % for high density and durability and between about 50 vol. % and about 70 vol. % for lightweight and low thermal conductivity.

Figure 4:
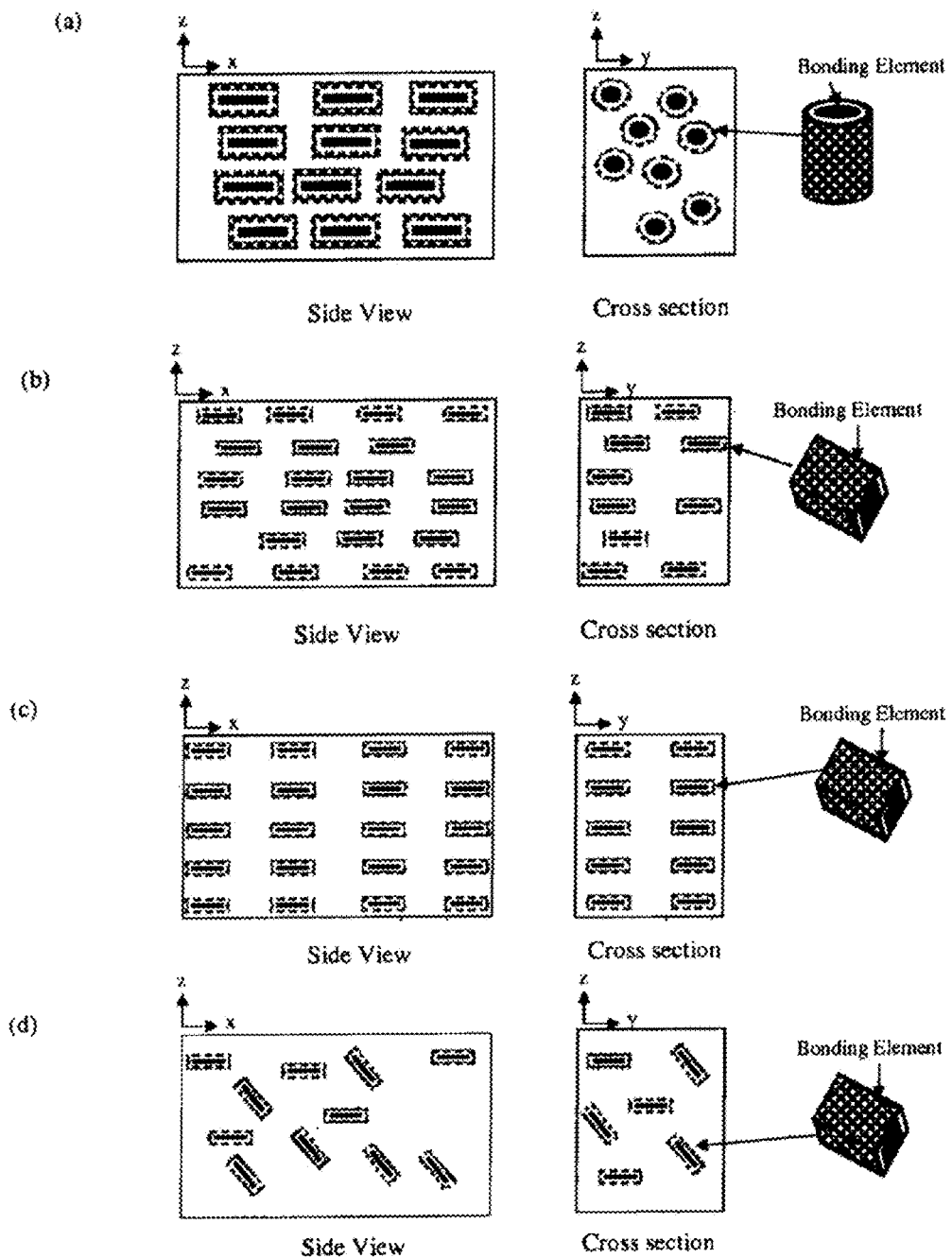
FIGS. 4(a)-4(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.
Figure 4:
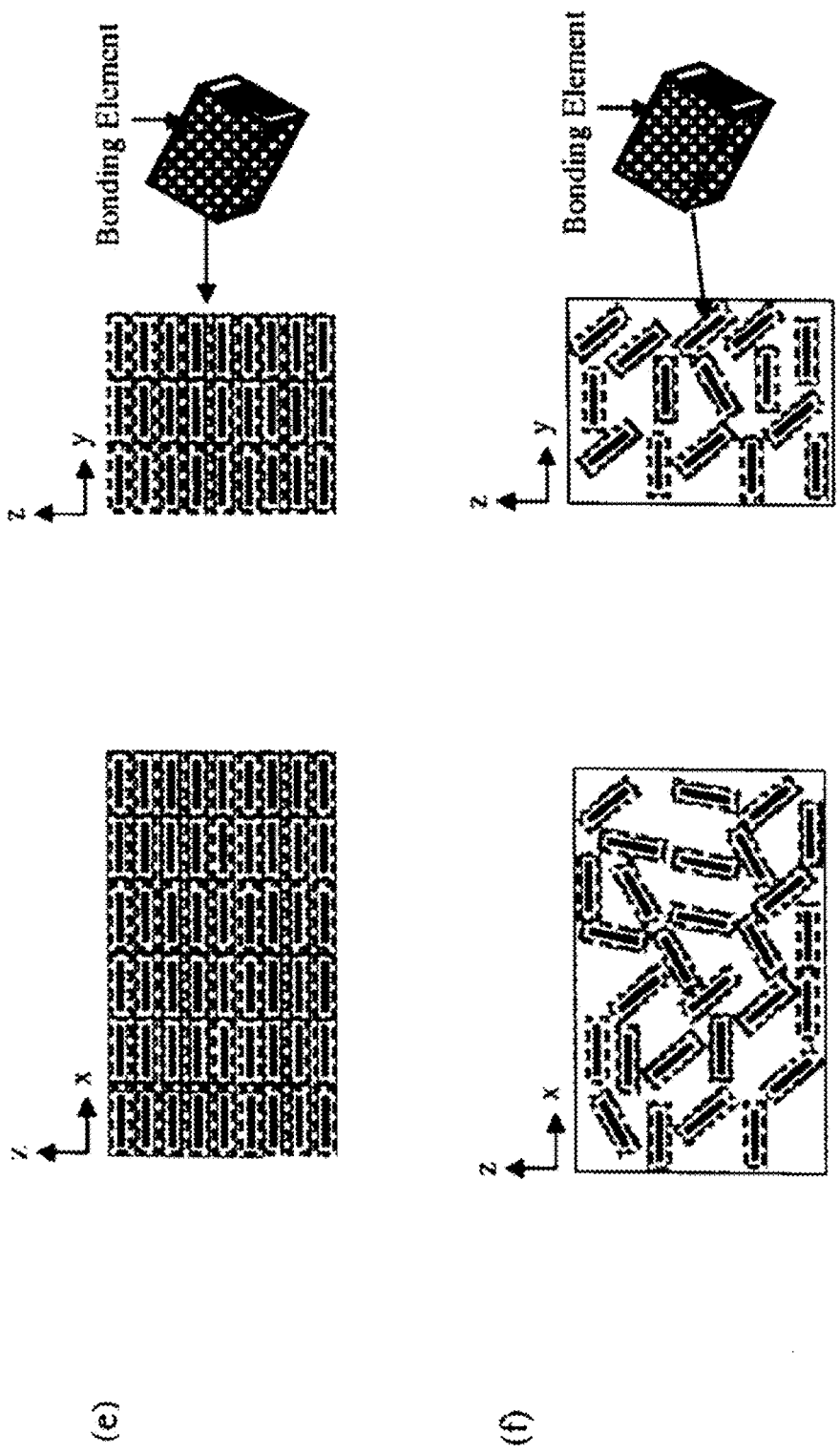

Within the bonding matrix, the bonding elements may be positioned, relative to each other, in any one of a number of orientations. FIGS. 4(a)-4(f) schematically illustrate an exemplary bonding matrix that includes fiber- or platelet-shaped bonding elements in different orientations possibly diluted by the incorporation of filler material, as represented by the spacing between the bonding elements. FIG. 4(a), for example, illustrates a bonding matrix that includes fiber-shaped bonding elements aligned in a one-direction ("1-D") orientation (e.g., aligned with respect to the x direction). FIG. 4(b) illustrates a bonding matrix that includes platelet-shaped bonding elements aligned in a two-direction ("2-D") orientation (e.g., aligned with respect to the x and y directions). FIG. 4(c) illustrates a bonding matrix that includes platelet-shaped bonding elements aligned in a three-direction ("3-D") orientation (e.g., aligned with respect to the x, y and z directions). FIG. 4(d) illustrates a bonding matrix that includes platelet-shaped bonding elements in a random orientation, wherein the bonding elements are not aligned with respect to any particular direction. FIG. 4(e) illustrates a bonding matrix that includes a relatively high concentration of platelet-shaped bonding elements that are aligned in a 3-D orientation. FIG. 4(f) illustrates a bonding matrix that includes a relatively low concentration of platelet-shaped bonding elements that are situated in a random orientation (a percolation network). The composite material of FIG. 4(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 4(e), or random orientation, e.g., FIG. 4(f), of bonding elements. Examples of connectivity patterns can be found in, for example, Newnham, et al., "Connectivity and piezoelectric-pyroelectric composites", *Mat. Res. Bull.* vol. 13, pp. 525-536, 1978).

Furthermore, one or multi-level repeating hierarchic structure can be achieved in a manner that can promote dense packing, which provides for making a strong material, among other potential useful, functional purposes. Hierarchy describes how structures form patterns on several length scales. Different types of bonding matrices can be created by varying the matrix porosity and by incorporating core fibers of different sizes. Different kinds of particulate and fiber components can be used with hierarchic structures to fabricate different kinds of structures with different connectivity.

C. Processes of Forming the Bonding Elements, Bonding Matrices and Composite Materials The transformation (curing) process proceeds by exposing the precursor material to a reactive liquid. A reactant associated with the liquid reacts with the chemical ingredients that make up the precursor particles, and more specifically, the chemical reactants in the peripheral portion of the precursor particles. This reaction eventually results in the formation of the first and second layers.

In some embodiments, the precursor particles include two or more chemical elements. During the transformation process, the reactant in the liquid preferentially reacts with at least a first one of the chemical elements, wherein the reaction between the reactant in the liquid (e.g., $CO_2$ and related species in solution) and the at least one first chemical element (e.g., calcium$^{2+}$) results in the formation of the first and second layers, the first layer comprising a derivative of the precursor particle, generally excluding the at least one first chemical element, whereas the second layer comprises a combination (e.g., $CaCO_3$) of the reactant and the at least one first chemical element. In comparison, the core comprises the same or nearly the same chemical composition as the precursor particle (e.g., $CaSiO_3$). For example, peripheral portions of the core may vary from the chemical composition of the precursor particle due to selective leaching of particular chemical elements from the core.

Thus, the core and the second layer share the at least one first chemical element (e.g., calcium$^{2+}$) of the precursor particle, and the core and the first layer share at least another one of the chemical elements of the precursor particle (e.g., $Si^{4+}$). The at least one first chemical element shared by the core and the second layer may be, for example, at least one alkaline earth element (beryllium, magnesium, calcium, strontium, barium and radium). The at least another one of the chemical elements shared by the core and the first layer may be, for example, silicon, titanium, aluminum, phosphorus, vanadium, tungsten, molybdenum, gallium, manganese, zirconium, germanium, copper, niobium, cobalt, lead, iron, indium, arsenic and/or tantalum.

In some embodiments, the reaction between the reactant in the liquid phase and the at least one first chemical element of the precursor particles may be carried out to completion thus resulting in the first layer becoming the core of the bonding element and having a chemical composition that is different from that of the precursor particles, and at least one additional or second shell layer comprising a composition that may or may not include the at least one first chemical element of the two or more chemical elements of the precursor particles.

C1. Gas-Assisted Hydrothermal Liquid Phase Sintering

The bonding elements may be formed, for example, by a method based on gas-assisted HLPS. In such a method, a porous solid body including a plurality of precursor particles is exposed to a liquid (solvent), which partially saturates the pores of the porous solid body, meaning that the volume of the pores are partially filled with water.

In certain systems such as those forming carbonate, completely filling the pores with water is believed to be undesirable because the reactive gas is unable to diffuse from the outer surface of the porous solid body to all of the internal pores by gaseous diffusion. Instead, the reactant of the reactive gas would dissolve in the liquid and diffuse in the liquid phase from the outer surface to the internal pores, which is much slower. This liquid-phase diffusion may be suitable for transforming thin porous solid bodies but would be unsuitable for thicker porous solid bodies.

In some embodiments, a gas containing a reactant is introduced into the partially saturated pores of the porous solid body and the reactant is dissolved by the solvent. The dissolved reactant then reacts with the at least first chemical element in the precursor particle to transform the peripheral portion of the precursor particle into the first layer and the second layer. As a result of the reaction, the dissolved reactant is depleted from the solvent. Meanwhile, the gas containing the reactant continues to be introduced into the partially saturated pores to supply additional reactant to the solvent.

As the reaction between the reactant and the at least first chemical element of the precursor particles progresses, the peripheral portion of the precursor particle is transformed into the first layer and the second layer. The presence of the first layer at the periphery of the core eventually hinders further reaction by separating the reactant and the at least first chemical element of the precursor particle, thereby causing the reaction to effectively stop, leaving a bonding element having the core as the unreacted center of the precursor particle, the first layer at a periphery of the core, and a second layer on the first layer.

The resulting bonding element includes the core, the first layer and the second layer, and is generally larger in size than the precursor particle, filling in the surrounding porous regions of the porous solid body and possibly bonding with adjacent materials in the porous solid body. As a result, net-shape formation of products may be formed that have substantially the same size and shape as but a higher density than the porous solid body. This is an advantage over traditionally sintering processes that cause shrinkage from mass transport to produce a higher density material than the initial powder compact.

C2. HLPS in an Autoclave

In an exemplary embodiment of the method of HLPS, a porous solid body comprising a plurality of precursor particles is placed in an autoclave chamber and heated. Water as a solvent is introduced into the pores of the porous solid body by vaporizing the water in the chamber. A cooling plate above the porous solid body condenses the evaporated water that then drips onto the porous body and into the pore of the porous solid body, thus partially saturating the pores of the porous solid body. However, the method of introducing water in this example is one of several ways that water can be delivered. For example, the water can also be heated and sprayed.

Meanwhile, carbon dioxide as a reactant is pumped into the chamber, and the carbon dioxide diffuses into the partially saturated pores of the porous body. Once in the pores, the carbon dioxide dissolves in the water, thus allowing the reaction between the precursor particles and the carbon dioxide to transform the peripheral portions of the precursor particles into the first and second layers.

As the reaction between the second reactant and the first layer progresses, the second reactant continues to react with the first layer, transforming the peripheral portion of the first layer into the second layer. The formation of the second layer may be by the exo-solution of a component in the first layer, and such a second layer may be a gradient layer, wherein the concentration of one of the chemical elements (cations) making up the second layer varies from high to low as you move from the core particle surface to the end of the first layer. It is also possible that the second layer can be a gradient composition as well, such as when the layers are either amorphous or made up of solid solutions that have either constant or varying compositions.

The presence of the second layer at the periphery the precursor core eventually hinders further reaction by separating the second reactant and the first layer, causing the reaction to effectively stop, leaving a bonding element having the core, the first layer at a periphery of the core and a second layer on the first layer. The resulting bonding element is generally larger in size than the original precursor particle, thereby filling in the surrounding porous regions of the porous solid body and bonding with adjacent materials of the porous solid body. As a result, the method allows for net-shape formation of products having substantially the same shape as but a higher density than the original porous solid body. This is an advantage over traditionally sintering processes that cause shrinkage from mass transport to produce a higher density material than the initial powder compact.

C3. Infiltration Medium

The infiltration medium used for transportation into at least a portion of the porous matrix includes a solvent (e.g., water) and a reactive species (e.g., $CO_2$). The solvent can be aqueous or non-aqueous. The solvent can include one or more components. For example, in some embodiments, the solvent can be water and ethanol, ethanol and toluene, or mixtures of various ionic liquids, such as ionic liquids based on alkyl-substituted imidazolium and pyridinium cations, with halide or trihalogenoaluminate anions. Wetting systems are preferred over non-wetting in order to simplify processing equipment.

The solvent should not be chemically reactive with the porous matrix, although the solvent may chemically react with reactive species. The solvent can be removed via a variety of separation methods such as bulk flow, evaporation, sublimation or dissolution with a washing medium, or any other suitable separation method known to one of ordinary skill in the art.

More specifically, the solvent is a liquid at the temperature where the dissolved reactive species react with the porous matrix. This temperature will vary depending on the specific solvent and reactive species chosen. Low temperatures are preferred over higher ones to save energy and simplify processing equipment thereby reducing manufacturing costs.

The role of the solvent contrasts with prior art involving reactive systems, such as, for example, Portland cement, where a solvent such as water reacts with a porous matrix to form products that contain solvent molecules, such as metal hydrates or metal hydroxides, among other precipitation products.

Regardless of the phase of the pure reactive species, the reactive species dissolve in the solvent as neutral, anionic or cationic species. For example, the at least one reactive species can be $CO_2$, which is a gas at room temperature that can dissolve in water as neutral $CO_2$ but can create reactive species such as $H_3O^+$, $HCO_3^-$, $H_2CO_3$ and $CO_3^{2-}$. Regardless of the initial phase of the reactive species and the solvent in the natural state, the infiltration medium is in a liquid phases in the pores (e.g., interstitial spaces) of a porous matrix.

For example, capillary forces can be used to wick the infiltration medium into a porous matrix spontaneously. This type of wetting occurs when the infiltration medium has a very low contact angle (e.g., <90° C.). In this case, the medium can partially fill (partially saturate) or fully fill (saturate) the pores. The infiltration can also take place in such a manner that the some pores are filled while others are empty and/or partially filled. It is also possible that an infiltrated porous matrix with gradients in pore filling or saturation can be later transformed to one that is uniform via capillary flow. In addition, wetting does not spontaneously occur when the contact angle of the infiltration medium is high (e.g.,)>90°. In such cases, fluids will not infiltrate the porous matrix unless external pressure is applied. This approach has utility when it is desirable to withdraw the infiltration medium by the release of pressure (e.g., a reaction can be initiated or halted by pressure).

When infiltration is done using spontaneous capillary flow in the pores, the bulk flow ceases when the pores are filled (saturated). During HLPS, the reactive species react with the matrix to form one or more products by the various reactions. The at least one reaction species is depleted from inside the pore space and thus need to be replenished during the course of the reaction. When pores are fully saturated with the infiltration medium, the reactive species must be transported from the infiltration medium external to the porous matrix through the matrix pores. In a quiescent fluid, diffusion is the process by which transport takes place. Thus, for some HLPS methods whose reactions inside the pores are fast relative to all other mass transport processes, the reaction becomes limited by large increases in the porous matrix thickness. In such a case, only the outer portion of the matrix reacts extensively with the reactive species, while inner regions of the porous matrix are either less completely reacted or unreacted. This type of reactions is suitable for preparation of gradient microstructures where the concentrations of products of the HLPS process are higher on the outside portion (near external surface regions) versus the interior of the structure.

C4. Process Selection and Control

When highly exothermic reactions proceed slowly relative to transport of the infiltration medium and the matrix is thermally insulating, entrapped heat can increase the rate of reaction in the interior of the matrix to enable its interior to contain more product phase (i.e., the product of the reaction between the at least one reactive species and a portion of the porous matrix) than its interior. For HLPS processes where reactions isothermally proceed at an intermediate rate relative to mass transport of the infiltration medium, diffusion can continue to supply the pores with reactive species and no gradient in the degree of reaction (or product concentration) will be observed. In such a case, there is little difference in the chemical and/or phase composition from the interior to the exterior of the material of the monolithic structure or body.

In many cases, a uniform microstructure with respect to phase and composition is desirable in the monolithic structure body. Furthermore, it is also desirable to conduct HLPS reactions in a relatively short time frame, for example, where large thick monolithic bodies are required for applications such as for roads or bridges. It is desirable to balance the rate of reaction and mass transport for HLPS processes. The strategy for precursor choice and method of introducing the precursors to comprise the infiltration medium is important. The preferred choice of precursors and method of introducing the infiltration medium is at least in part a function of the sample thickness in the thinnest direction, the time scale considered acceptable for the process and the thermodynamic and kinetic constraints needed for the process to be commercially viable, such as temperature, pressure and composition.

Table 3 summarizes the precursor choice and method of introduction strategies. The porous matrix can be directly infiltrated or the porous matrix may be evacuated prior to any of the infiltration sequences described in the Table 3. Methods are described that use gases as precursors, liquids as precursors or solids as precursors. In addition, phase mixtures such as solid and liquids, gases and liquids and gas and solids can all be used. For example, a reactant such as $CO_2$ is a gas in its pure state but is converted to a solution species dissolved into water. Such an event can come about by gaseous diffusion into the porous matrix and subsequent condensation when a pore is encountered. This type of precursor system is relevant when microstructures having carbonate phases are desired. The order of addition of the precursors (solvent and reactive species) can influence the reaction yield and microstructure of the material.

TABLE 3

Precursors and Methods of Introduction

| System | Reactive Species | Solvent | Deliquescent Material | Methods of Introduction (Reverse/different order may be applied where appropriate) |
|---|---|---|---|---|
| (1) | Gas | Gas | | Pre-mixing (parallel introduction) two gases and introducing them to a lower temperature to condense one or more gas species in the matrix to comprise an infiltrating solution containing reactive species and solvent or condense the gas mixture in the matrix by cooling the matrix; or Gases can also be introduced in series where one gas is condensed prior to infiltration or after infiltration and the other is introduced afterwards to dissolve in the liquid phase. |
| (2) | Gas | Gas | Solid | Pre-mixing deliquescent solid with matrix, pre-mix gases (parallel introduction) then flow and/or diffuse the gas mixture through the matrix to form infiltrating solution; or Gases can be introduced in series into the deliquescent solid-matrix pre-mixture. The preferred order is to have the gas that liquefies the deliquescent solid and then the gas that dissolves to form reactive species. |
| (3) | Gas | Liquid | Solid | Pre-mixing deliquescent solid with matrix, then infiltrate with liquid solvent, followed by adding gas (or visa-versa) to form infiltrating solution in matrix pores; or Gas and liquid can be pre-mixed as a solution for introduction into the deliquescent solid-matrix pre-mixture but reaction yield might be reduced. |
| (4) | Liquid | Liquid | | Pre-mixing (parallel introduction) fluids then infiltrate matrix; or Infiltrate fluids through matrix in series with preferred ordering being liquid solvent prior to liquid that provides reactive species. |
| (5) | Liquid | Liquid | Solid | Pre-mixing of deliquescent solid with matrix, then add liquid solvent to dissolve deliquescent solid, followed by adding liquid reactive species (or visa-versa) to form infiltrating solution; or Pre-mixing solvent and reactive species in liquid phases as an infiltration solution for introduction into the deliquescent solid-matrix pre-mixture |
| (6) | Liquid | Gas | | Infiltrating matrix with gas and condense in matrix as liquid, then infiltrating second liquid into matrix to mix with first liquid in matrix; or Preferred route is premixing of gas and liquid by condensing gas and mixing into second liquid, then introduce solution to a porous matrix |
| (7) | Gas | Liquid | — | Infiltrating liquid followed by introducing gas; or Pre-dissolving gas in liquid followed by infiltrating |
| (8) | Solid | Solid | | Mixing solids with porous matrix, then pressurizing or heating to form infiltration liquid. One solid may flux the other to form a liquid phase that can be removed later by washing. Other solids can be added to reduce melting temperature to form liquid phase as long as it can be removed later. |
| (9) | Liquid | Solid | | Preparing infiltration solution by dissolving solid in liquid, followed by infiltration; or Pre-mixing solid with porous matrix, then infiltrate with liquid |
| (10) | Solid | Liquid | | Preparing infiltration solution by dissolving solid in liquid, then infiltrate; or Pre-mixing solid with porous matrix, then infiltrate with liquid |

In some embodiments, the solvent and reactive species may be premixed to form the infiltration medium and then introduced into the matrix in a single step. In other embodiments, it may be preferable to employ multiple infiltration sequences. For example, the solvent precursor could be introduced first followed by infiltration of the reactive species or vice versa.

Neither the solvent nor the reactive species precursors need to be the same phase initially as the infiltrating medium will be a liquid that is found in the pores of the matrix. For example, the solvent precursor can be a vapor such as water, which is gaseous at temperatures at 100° C. or higher at atmospheric pressure and can be condensed to a liquid by cooling the matrix to a temperature lower than 100° C. or utilizing surface energy by using porous matrices with pore sizes in the Kelvin pore-size range (less than 100 nm). When the pores are large, the temperature is elevated such that gaseous species cannot be thermally condensed, small amounts of infiltrating solution are needed or other reasons not discussed here, and it may be desirable to form the liquid in the pore using a deliquescent compound. Examples of such compounds include boric acid, iron nitrate, and potassium hydroxide. In this case, a vapor such as water can convert the deliquescent solid phase in the pore to a liquid and crystal growth of the product phase can proceed in the pore. This is particularly useful when liquid infiltration and diffusion limits the thickness of the product made by HLPS. Alternatively, gaseous diffusion can be used to transport species over much large distances to form the infiltration medium required for HLPS inside of the pores of the matrix.

Various additives can be incorporated to improve the HLPS process and the resulting products. Additives can be solids, liquids or gases in their pure state but either soluble in the solvent phase or co-processed (e.g., pre-mixed) with the porous matrix prior to incorporation of the infiltration medium. Examples include nucleation catalysts, nucleation inhibition agents, solvent conditioners (e.g., water softening agents), wetting agents, non-wetting agents, cement or concrete additives, additives for building materials, crystal morphology control additives, crystal growth catalysts, additives that slow down crystal growth, pH buffers, ionic strength adjusters, dispersants, binders, rheological control agents, reaction rate catalysts, electrostatic, steric, electrosteric, polyelectrolyte and Vold-layer dispersants, capping agents, coupling agents and other surface-adsorptive species, acid or base pH modifiers, additives generating gas, liquids or solids (e.g., when heated, pressurized, depressurized, reacted with another species or exposed to any processing variable no listed here), and biological or synthetic components (e.g., serving any of the above functions and/or as a solvent, reactive species or porous matrix).

In some embodiments, a deliquescent solid may be used. The deliquescent solid may be premixed with the porous matrix. Then pre-mixture of the solvent and at least one reactive species can be introduced to the deliquescent solid-porous matrix. The solvent and at least one reactive species in the pre-mixture can be both in the gaseous phase or both in liquid phases. In some embodiments, the solvent may be a liquid and the at least one reactive species may be in a gaseous phase in the pre-mixture or vice versa.

A gas-water vapor stream can be passed over a deliquescent salt in the porous matrix to generate the infiltrating medium in a liquid phase in the interstitial space in the porous matrix. For example, a humid gas-water vapor stream can serve as a solvent for $CO_2$ dissolution and ionization. A large number of salts are known to be deliquescent and can be used suitable for forming liquid solutions from the flow of humid air over the salt surfaces. Selection of the appropriate salt relies on the level of humidity in the air. Some salts can operate at very low relative humidity. Examples of deliquescent slats include $Mg(NO_3)_2$, $CaCl_2$ and NaCl.

Regarding delivery of the infiltration medium, it can be delivered as a bulk solution that spontaneously wets the porous matrix. There are many options for delivery of this solution. First, the porous matrix can be immersed in the liquid. Second the infiltration solution can be sprayed onto the porous matrix. In a quiescent system, when there is a volume of infiltration solution that is greater than the pore volume of the porous matrix, diffusion propagates the reaction by delivering the reactive species to the pore sites.

Alternatively, the fluid can flow (mechanically convected) through the porous matrix by a variety of methods. Methods such as pressurized flow, drying, electro-osmotic flow, magneto-osmosis flow, and temperature- and chemical-gradient-driven flow can be used to flow the liquid infiltration medium through the porous body. This dynamic flow allows fresh reactant to be near the porous matrix, as opposed to relying on diffusional processes. This approach is beneficial as long as the pore size distribution of the matrix permits a reasonably high flow rate of a fluid that supplies reactive species faster than a diffusional process and is optimal when the supply rate equals or exceeds the reaction rate for product formation. In addition, flow-through of the infiltration medium is especially useful for highly exothermic reactions. This is particularly beneficial for monolithic structures that are thick and can generate heat internally capable of generating internal pressures capable of fracturing the monolithic structure.

There are many applications where thicknesses of materials exceed this length scale. In these cases, mechanical convection of the fluid by any suitable means known to one of skill in the art is preferred. An alternative is to introduce the solvent or reactive species as a gaseous species. Also, supercritical conditions can be employed to achieve transport rates that lie between liquids and gases. Gas species may be mechanically convected by applying a pressure gradient across the porous matrix. If the gas is a reactive species, pores filled with solvent fluid can flow out of the pores leaving behind a film of solvent on the pores that can absorb the reactive species gas. Alternatively, partially filled pores will allow gas to flow through the pores as the solvent absorbs a portion of the gas flowing through.

A system may utilize low temperatures and low pressures to enable a low cost process. Thus, processes that retain a fraction of solvent in the pores to facilitate gaseous diffusion of reactive species are preferred over those that utilize quiescent fluids for reactions where a large fraction of product is desired. There are many apparatus designs that can effectively transport reactant and solvent species to the pores. Some of these designs involve conventional reactor equipment such as filter presses, spray chambers, autoclaves and steamers.

D. $CO_2$ Curing Chambers

The invention provides apparatus and methods for low cost, energy efficient and low carbon footprint curing of concretes which utilize carbon dioxide as a reactant. We now describe the engineering design principles and methods that provide carbon capture and utilization with minimal to no cost increase as compared to traditional Portland cement concrete curing chambers.

D1. Concrete Curing Using $CO_2$

The systems and methods of the invention are employed using materials and chemistries that rely on the presence of $CO_2$ for curing, such as $CO_2$ in a reaction medium such as water, in which carbonic acid, carbonate ions, and bi-carbonate ions is provided. Examples of such materials and chemistries have been described hereinabove.

The $CO_2$ concrete curing process described herein is generally similar to the conventional concrete curing process described above, with the significant difference that five parameters are independently controlled in the controlled curing environment versus the original two describe in traditional curing. In addition to temperature and humidity, the system pressure, the concentration of carbon dioxide, and the gas velocity within the chamber are also controlled. A distinction regarding the humidity control is that in the conventional prior art systems, humidity is raised above ambient because water is a reagent in the curing of Portland cement, while in the systems and methods according to the present invention, water is not a reagent but rather is a reaction medium. Rather, in the present systems and methods $CO_2$ is the reagent. Accordingly, is the present invention, water vapor, temperature and gas velocity may be controlled to cause water to be either removed from the curing product or added to the curing product as may be required Both "big room" and "multi-lane" type curing systems as described in conventional concrete curing systems may also be utilized in CO2 curing systems.

Figure 5:
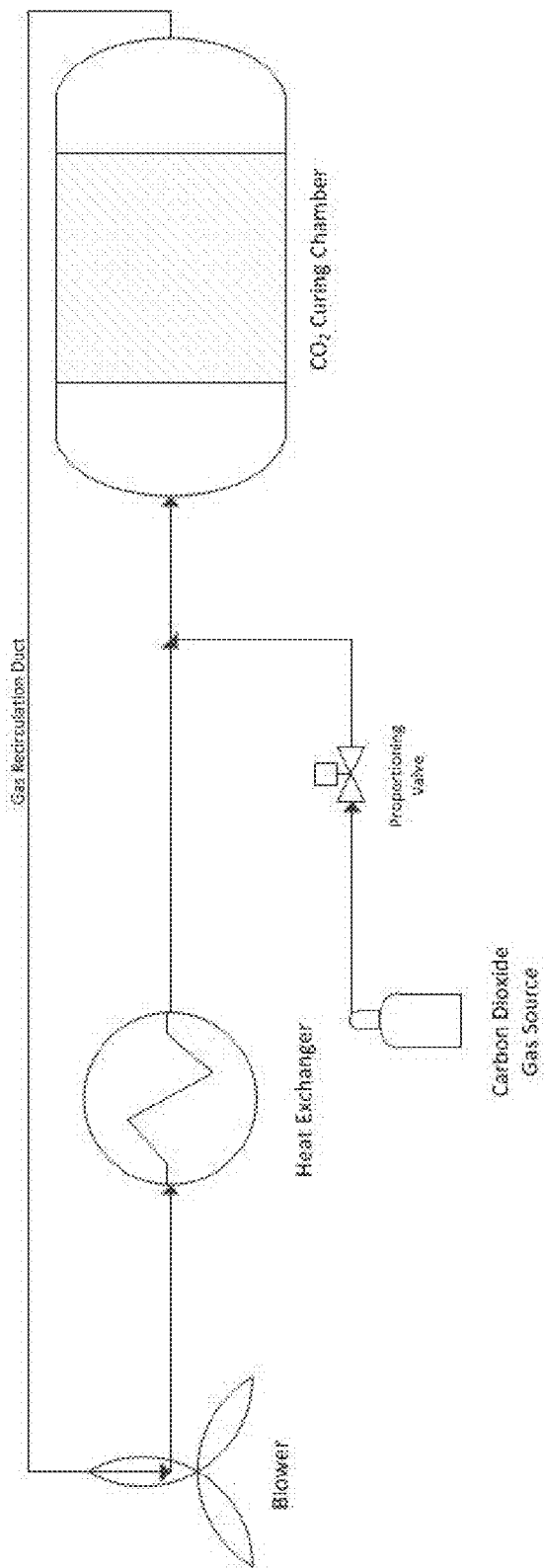
FIG. 5 is a schematic diagram of a $CO_2$ concrete curing chamber constructed and operated according to principles of the invention.

FIG. 5 is a schematic diagram of a $CO_2$ concrete curing chamber constructed and operated according to principles of the invention. In FIG. 5 a curing chamber is supplied with $CO_2$ from a source by way of a proportioning valve, which can control the pressure, the flow rate, and the duration of flow of the $CO_2$. The $CO_2$ atmosphere is recirculated through a blower and a heat exchanger or heater, so that the temperature of the atmosphere within the curing chamber can be regulated or modified. In some embodiments, a heat exchanger can be used to cool the atmosphere within the curing chamber, for example if the curing reaction is sufficiently exothermic that the atmosphere is being heated excessively.

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at specific temperature such that it maintains a vapor pressure of approximately 300 PSIG. This gas is then piped and pressure regulated to a $CO_2$ curing chamber. Alternatively, $CO_2$ captured at industrial facilities (including but not limited to ammonia production plants, natural gas processing plants, cement manufacturing plants, glass manufacturing plants, $CO_2$ from landfills and other biogases, biodiesel plants) and combustion source facilities (e.g., electric power or steam production) can be used. In addition, $CO_2$ produced from carbon dioxide production wells that drill in the earth to extract a carbon dioxide stream from a geologic formation or group of formations which contain deposits of carbon dioxide can also be used.

D2. $CO_2$ Concrete Curing Temperature Controls

In some embodiments, temperature is measured utilizing a sensor such as a thermocouple or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

D3. $CO_2$ Concrete Curing Humidity Control Options

Figure 6:
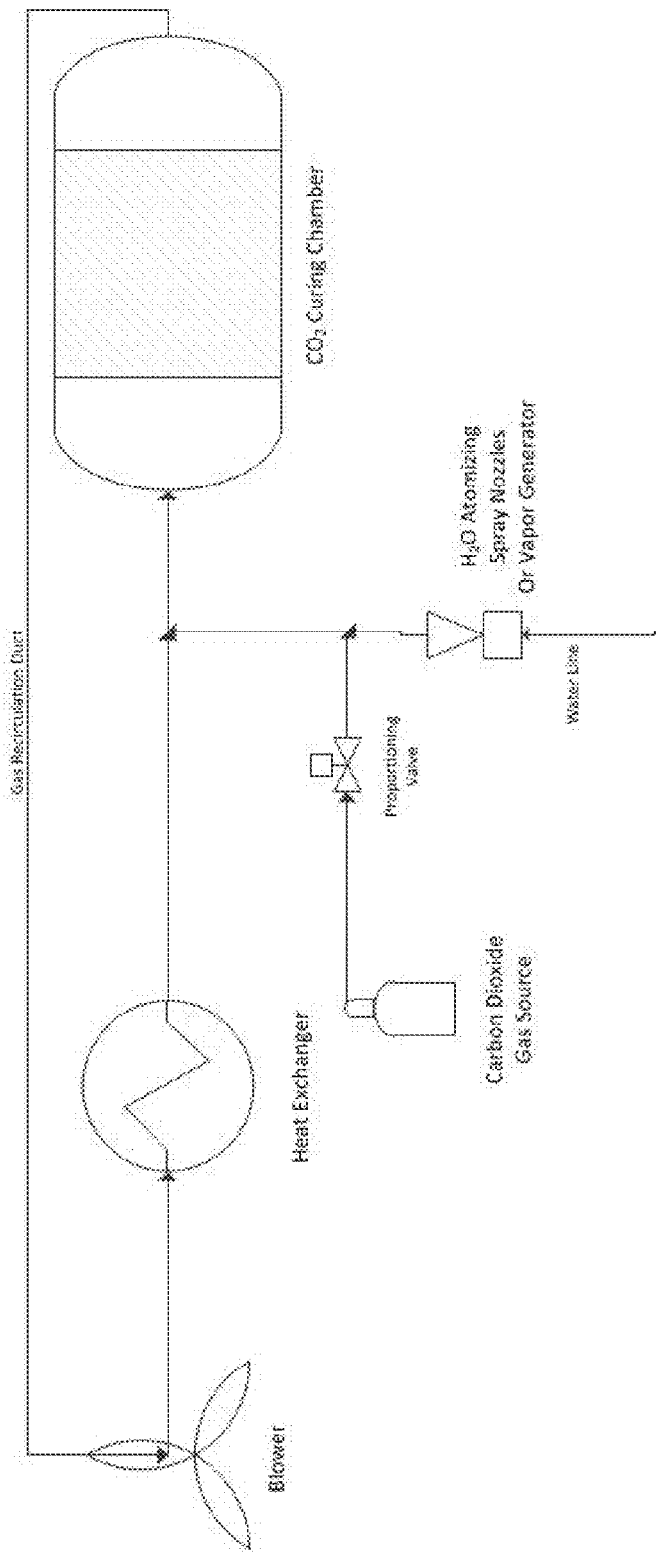
FIG. 6 is a schematic diagram of a CO₂ concrete curing chamber that provides humidification according to principles of the invention.

FIG. 6 is a schematic diagram of a $CO_2$ concrete curing chamber that provides humidification according to principles of the invention. In FIG. 6, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ concrete curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors in the $CO_2$ concrete curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ concrete curing processes that could be combined into a single system. The method for humidification in one embodiment of a $CO_2$ curing system is represented in FIG. 6.

Figure 7:
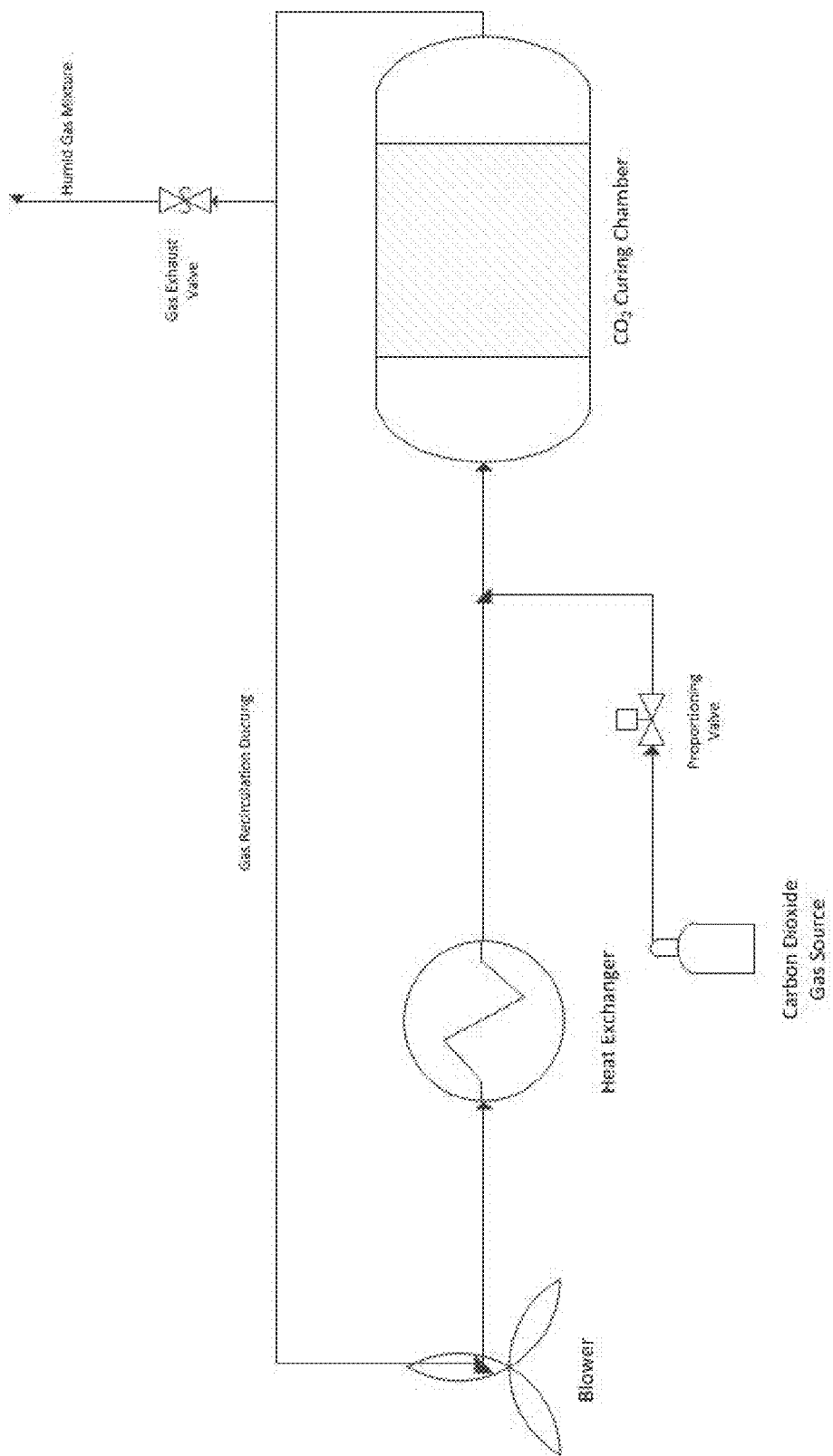
FIG. 7 is a schematic diagram of a CO₂ curing chamber that provides dehumidifcation by purging humid gas according to principles of the invention.

FIG. 7 is a schematic diagram of a $CO_2$ curing chamber that provides dehumidifcation by purging humid gas according to principles of the invention. As mentioned, in some cases it is necessary to remove moisture from the system to cure the concrete products with $CO_2$. A simple method of reducing the relative humidity is by displacing the humid gas in the system with a dry gas, in this case carbon dioxide. The humid $CO_2$ gas mixture is released via an exhaust valve that could be a proportioning control valve or an automatic bleed valve, and make up dry $CO_2$ enters the recirculating system so as to decrease the relative humidity to the desired set point while maintaining the regulated pressure and gas flow within the curing system. In this type of purging dehumidification, a disadvantage is that a greater amount of carbon dioxide will be exhausted from the system. However, an advantage is that the amount of water vapor can be driven down to the concentration of water vapor in the incoming purge gas, which is some instances can be extremely low if the $CO_2$ purge gas is generated by vaporization of liquid $CO_2$.

Figure 8:
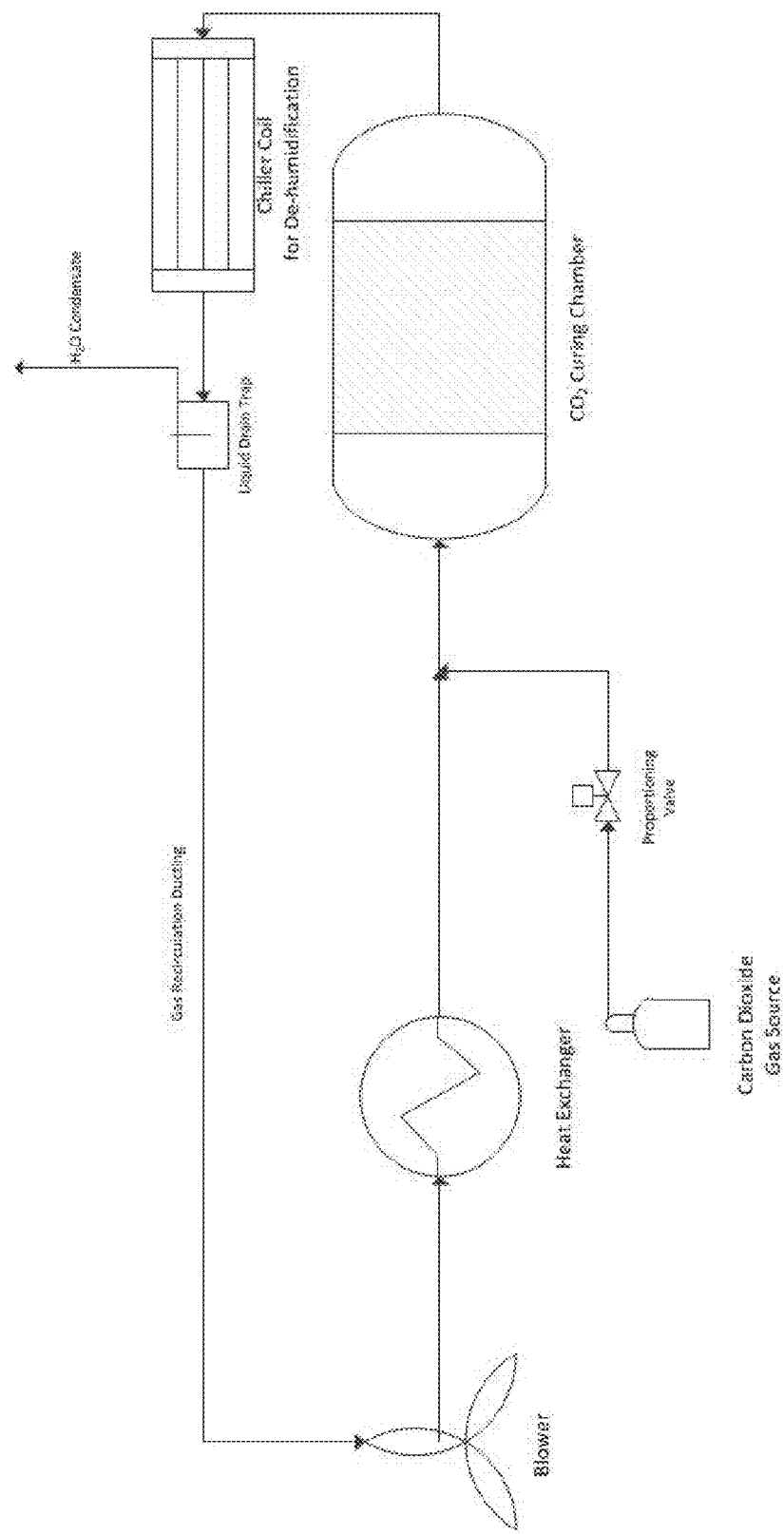
FIG. 8 is a schematic diagram of a CO₂ curing chamber that provides dehumidifcation using a chilled heat exchanger according to principles of the invention.

FIG. 8 is a schematic diagram of a $CO_2$ curing chamber that provides dehumidifcation using a chilled heat exchanger according to principles of the invention. In an alternative embodiment, the dehumidification apparatus and method shown in FIG. 8 represents a technique to reduce relative humidity and therefore remove water vapor from the gas by a non-purging method. This particular technique uses a water extraction apparatus and method to remove the water, which in one preferred embodiment is a chilled heat exchanger. A recirculating chiller unit circulates a water and ethylene glycol solution chilled down between −15 C and 15 C through a high surface area stainless steel heat exchanger coil that is mounted in the direct line of humid gas flow. Some water from the gas stream will undergo a phase transition and condense to form a liquid on the coil, which can then be collected and drained out of the system via a liquid drain trap, conventional valve, or a solenoid valve on a timer to drain the liquid and not the gas. The benefit of using this type of system is that during the process a very minimal amount of carbon dioxide gas will be ejected and wasted as compared to the purging dehumidification method shown in FIG. 7. One disadvantage of this technique is the need for some extra equipment that is not standard in traditional concrete curing chambers. Another disadvantage is that the energy demand of the system will increase to operate the chiller unit.

In some situations, for example if there is a need to remove a large amount of water from the system, the two dehumidification methods mentioned above may be operated together to keep humidity levels as low as possible.

D4. Filling and Concentration Ramp Up of Carbon Dioxide in the Curing System

At the start of a curing process, a pre carbon dioxide dwell period with control of parameters such as temperature, relative humidity, and gas velocity may first exist, at which point carbon dioxide concentrations may be increased in a curing chamber by flowing $CO_2$ into the system from the gas source and displacing air out of the chamber, which is called the purging cycle. Throughout the purging cycle an excess of carbon dioxide will be used which accounts for some small yet unavoidable waste in the process. In some embodiments, it is expected that the exiting gas can be collected and fractionated to recover the $CO_2$ that would otherwise be lost by venting or by being transferred to a secondary curing chamber or an additional bay in a multi-lane curing system. The purging cycle is concluded when the desired concentration of $CO_2$ in the curing chamber is reached. The concentration of $CO_2$ can be measured utilizing a variety of different measurement techniques such as non-dispersive infrared sensing or gas chromatography. Reaction rates in the carbonating cement compositions described hereinabove have a strong relationship to carbon dioxide concentration, and therefore typically high $CO_2$ concentrations are reached at the beginning of the reaction cycle, but this does not have to be the case in all instances. After the purging cycle, the relative humidity, temperature, and gas velocity in the chamber can be adjusted to reduce the evaporation of water from the specimens in the chamber if required.

In the embodiments described herein, carbon dioxide is a reactant and will be consumed in the process. Therefore it is important to replenish the supply of $CO_2$ throughout the process so as to maintain a desired rate of reaction. After the high flow of $CO_2$ into the chamber in the purge cycle has concluded, a few options exist to maintain a high level of $CO_2$ during the reaction.

D5. $CO_2$ Replenishment by Constant Flow and Bleed (Open Loop)

Figure 9:
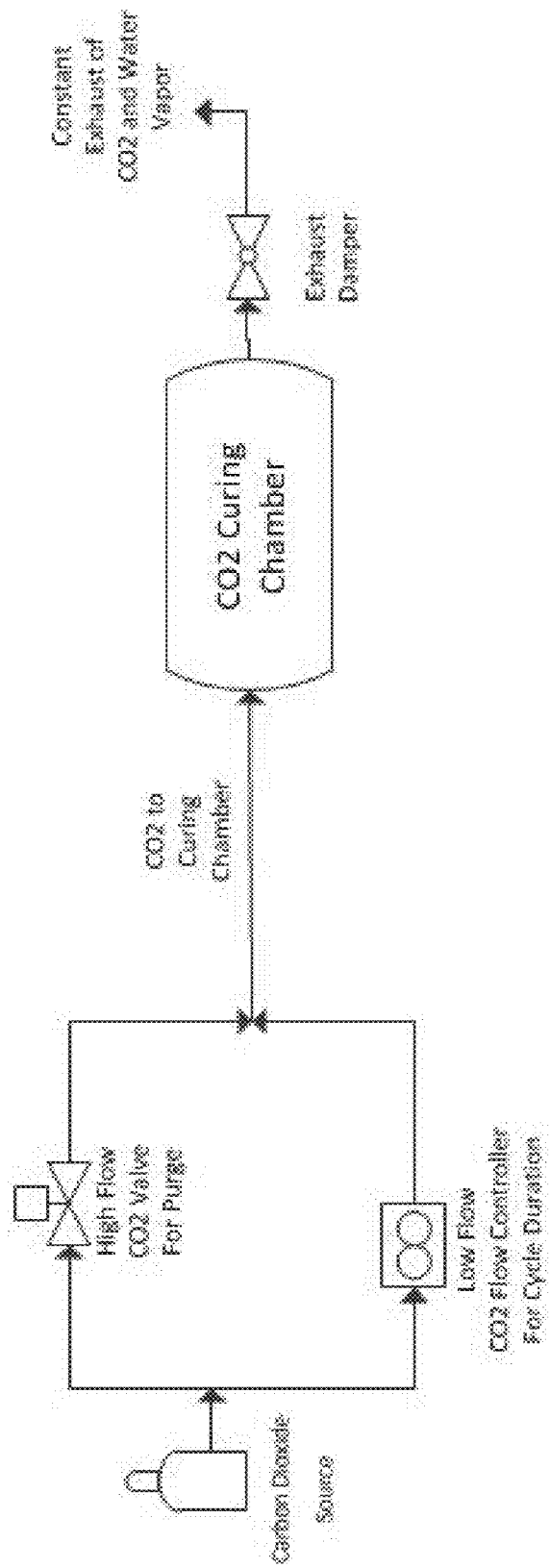
FIG. 9 is a schematic diagram of a curing chamber that has a CO₂ purge line and a constant flow CO₂ replenishment line according to principles of the invention.

One technique that can be applied is to utilize a consistent yet low flow of $CO_2$ throughout the entire duration of the curing process while bleeding out a low flow of exhaust gas. This type of curing system can be of the simplest and require the minimum amount of feedback and control from system and be utilized when a profile is not yet known for a product or when precise control is not required. However, it may also be configured in a sophisticated manner that could have flow meters on the inlet and outlet of the system to conduct a mass balance of $CO_2$ and determine the rates and total amounts of $CO_2$ sequestered using a computerized control system which could ultimately indicate reaction rates and determine when the curing process has completed. This will allow $CO_2$ concentrations to be replenished. The flow rate of the make up $CO_2$ need only be as high as the rate of gas consumed in the process. The secondary effect of this method is a "purging dehumidification" as described earlier by using the dry gas to carry away the moist gas. This process can be implemented by providing a high flow $CO_2$ valve for the purging cycle and a low flow $CO_2$ valve or flow controller for the replenishment throughout the duration of the curing cycle, as illustrated in FIG. 9. As described earlier, this methodology for $CO_2$ replenishment and dehumidification require $CO_2$ in excess of what is required in the reaction.

This constant flow methodology is called flow through reacting, and is also useful for processes utilizing continuous $CO_2$-rich gas waste streams. Such waste streams could be flue gasses from a variety of industries including but not limited to cement kilns, glass melting kilns, power plants, biogases, and the like. Therefore, such constant flow chambers can be configured and compatible with both an industrial $CO_2$ gas supply as well as waste gas streams. Solidia Drum Reactors shown in FIG. 12 through FIG. 15 are an example of a small scale unit that can be utilized as a low flow $CO_2$ replenishment system.

D6. Low Pressure Regulated Replenishment

After the $CO_2$ purging cycling there is another method to maintain $CO_2$ concentrations throughout the duration of the curing cycle. This alternative method uses low pressure regulation. In a mechanically regulated system a low pressure diaphragm regulator is used. This regulator can control pressures to as low as 1 inch of $H_2O$ (or approximately 1/400 of an atmosphere). These regulators are highly sensitive and allow for replenishment of $CO_2$ only as the pressure is decreased due to the consumption of $CO_2$ in the reaction process. An example of this type of system is the Solidia small scale Drum Reactor that can be configured for low pressure regulated replenishment as well as constant flow replenishment.

Figure 10:
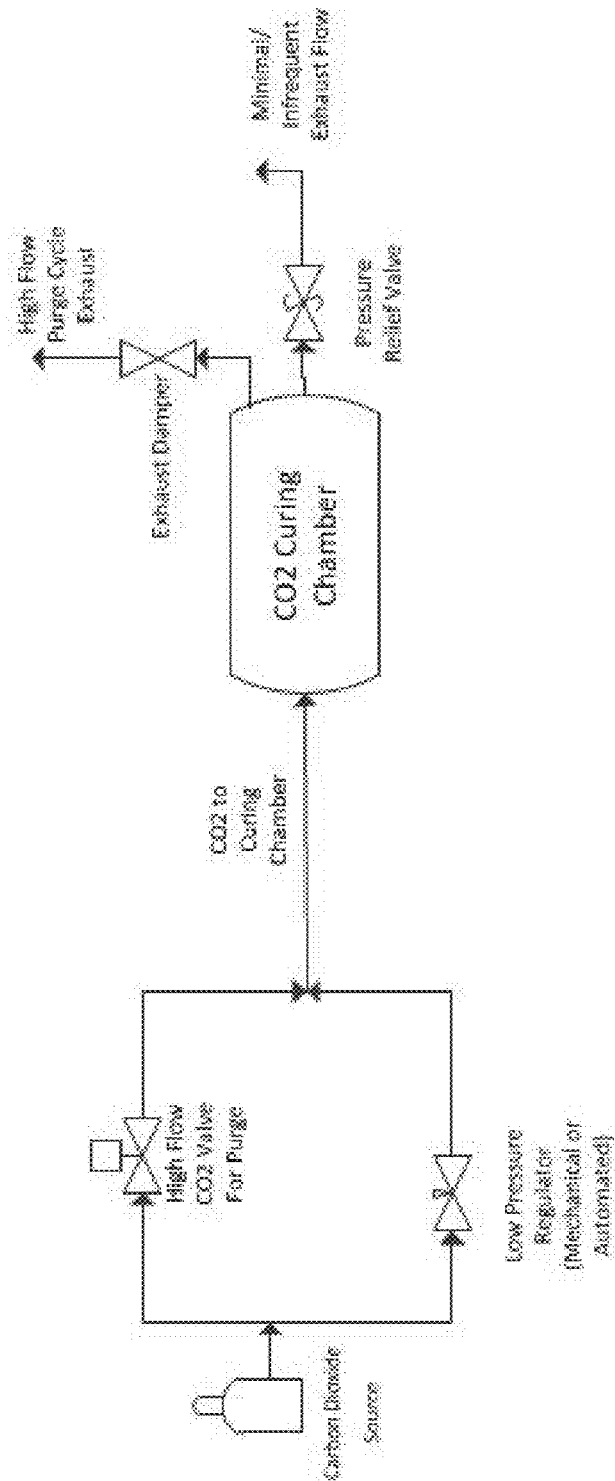
FIG. 10 is a schematic diagram of a curing chamber that has a CO₂ purge line and that can provide regulated pressure CO₂ replenishment according to principles of the invention.

In another embodiment, an electronic approach can be used by measuring the pressure in the system with a highly accurate low pressure transducer coupled with a proportioning control valve instead of a mechanical diaphragm valve. FIG. 10 is a schematic diagram of a curing chamber that has a $CO_2$ purge line and that can provide regulated pressure $CO_2$ replenishment using this technique. An example of this is the Solidia autoclave system operated at low pressure.

D7. $CO_2$ Concentration Closed Loop Regulation

Figure 19:
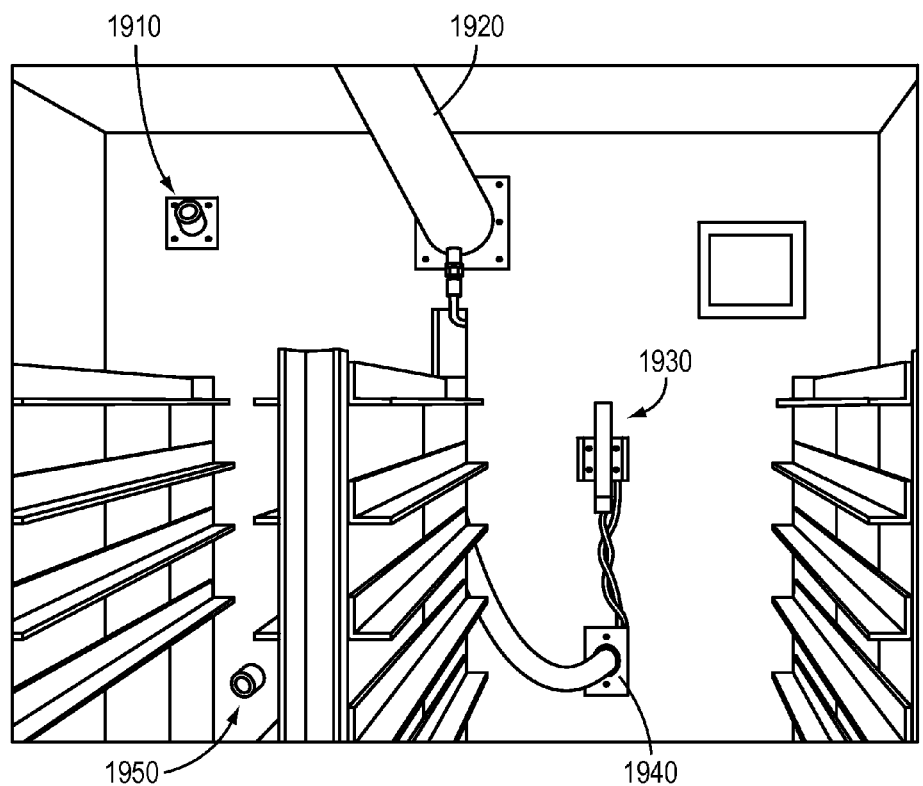
FIG. 19 is a view within the curing chamber that illustrates additional components that have been added.

Another method for sustaining carbon dioxide concentrations during the reaction is well suited for keeping a highly consistent concentration, although it is the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, as illustrated in FIG. 19 (see dry bulb-wet bulb humidity measurement device 1930) or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of concrete specimens.

Figure 11:
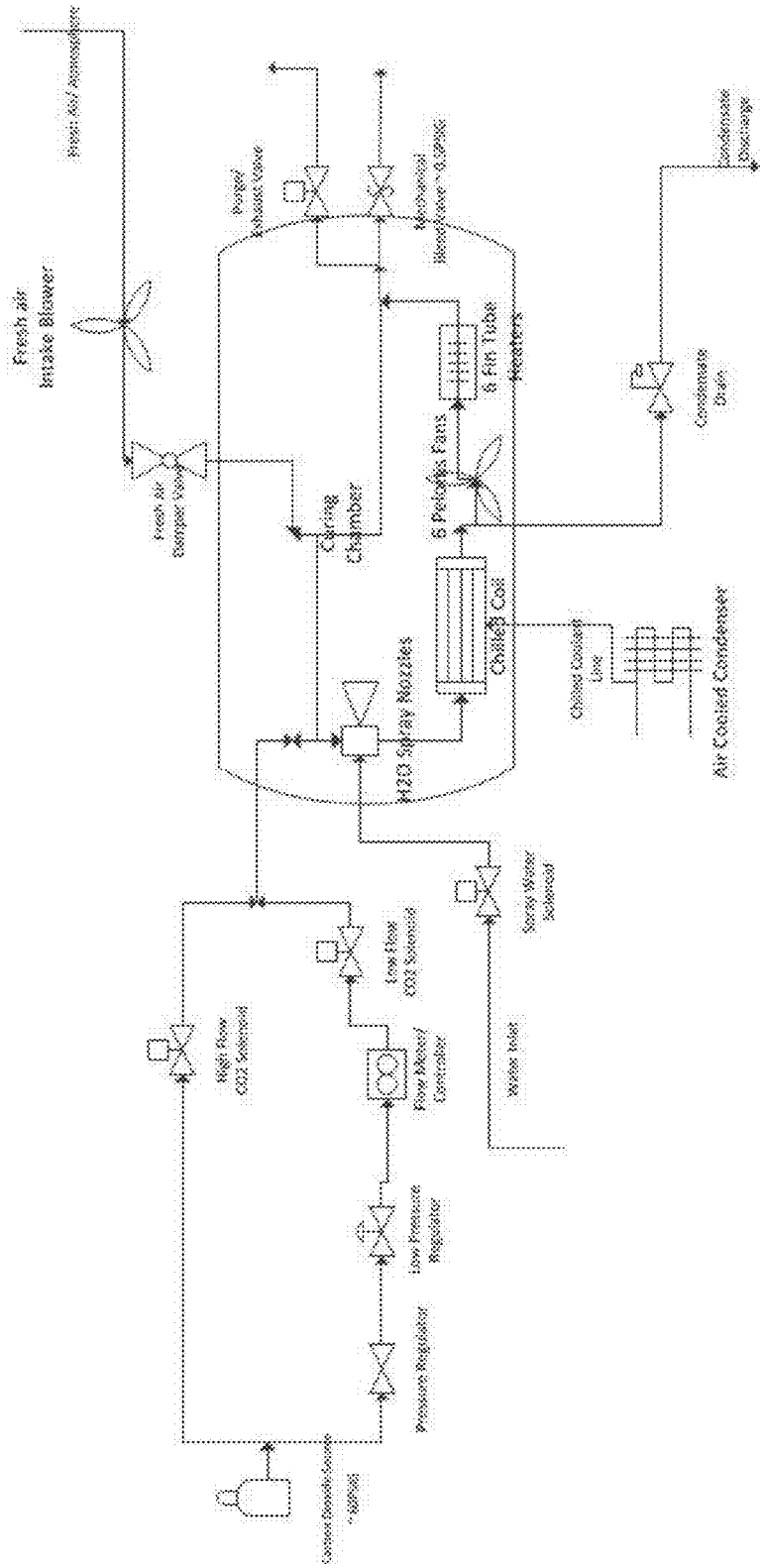
FIG. 11 is a schematic diagram of a midsized curing chamber with multiple methods of humidity control as well as ability to control and replenish CO₂ using constant flow or pressure regulation and that can control humidity according to principles of the invention.

FIG. 11 is a schematic diagram of a midsized curing chamber with multiple methods of humidity control as well as ability to control and replenish $CO_2$ using constant flow or pressure regulation and that can control humidity according to principles of the invention.

D8. Gas Velocity Control

Another important control parameter is gas velocity across the material that is to be cured in the system which can be very dependent on number of different aspects including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

APPARATUS EXAMPLES

FIG. 12 through FIG. 20 show various embodiments of apparata that are constructed and that operate according to the description of the inventive systems given herein.

Figure 12:
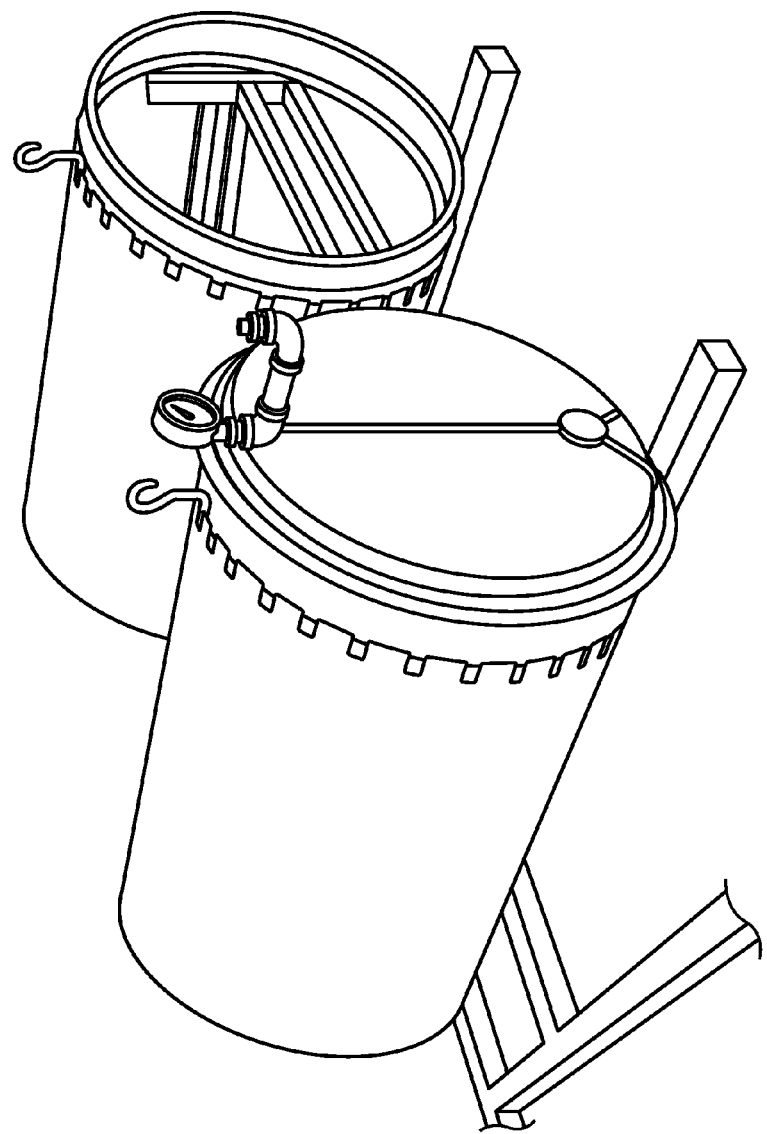
FIG. 12 is an image of several drum reactors constructed from 55 gallon stainless steel drums.

FIG. 12 is an image of several drum reactors constructed from 55 gallon stainless steel drums.

Figure 13:
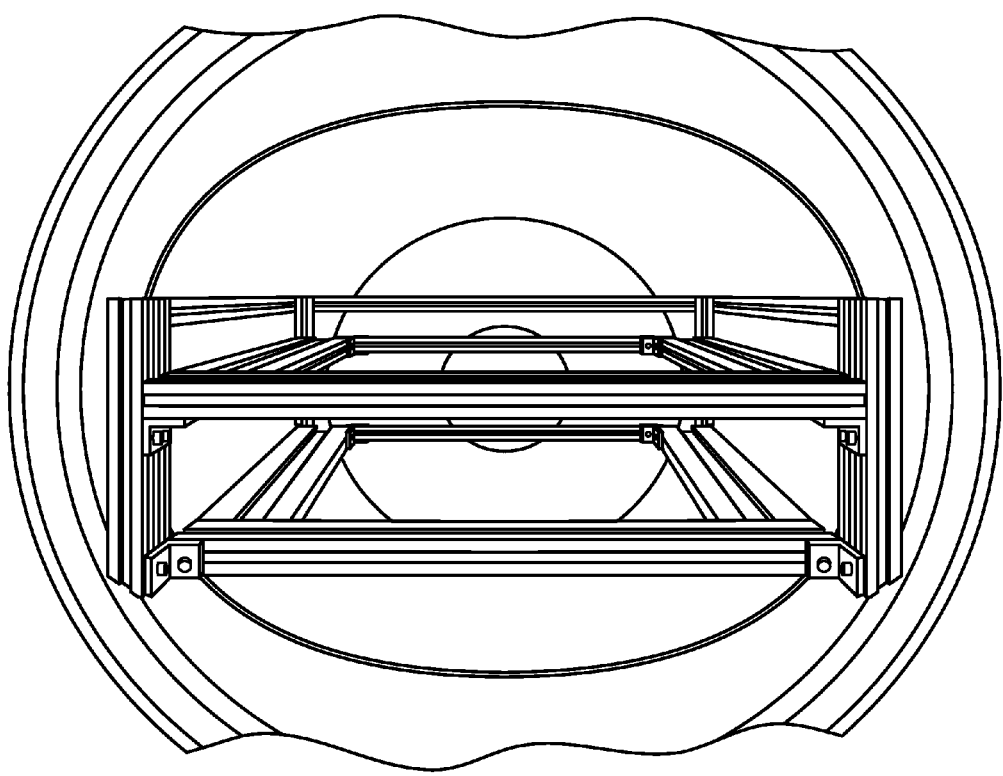
FIG. 13 is an image of the interior of a drum reactor including racks to support pallets of materials to be processed therein.

FIG. 13 is an image of the interior of a drum reactor including racks to support pallets of materials to be processed therein.

Figure 14:
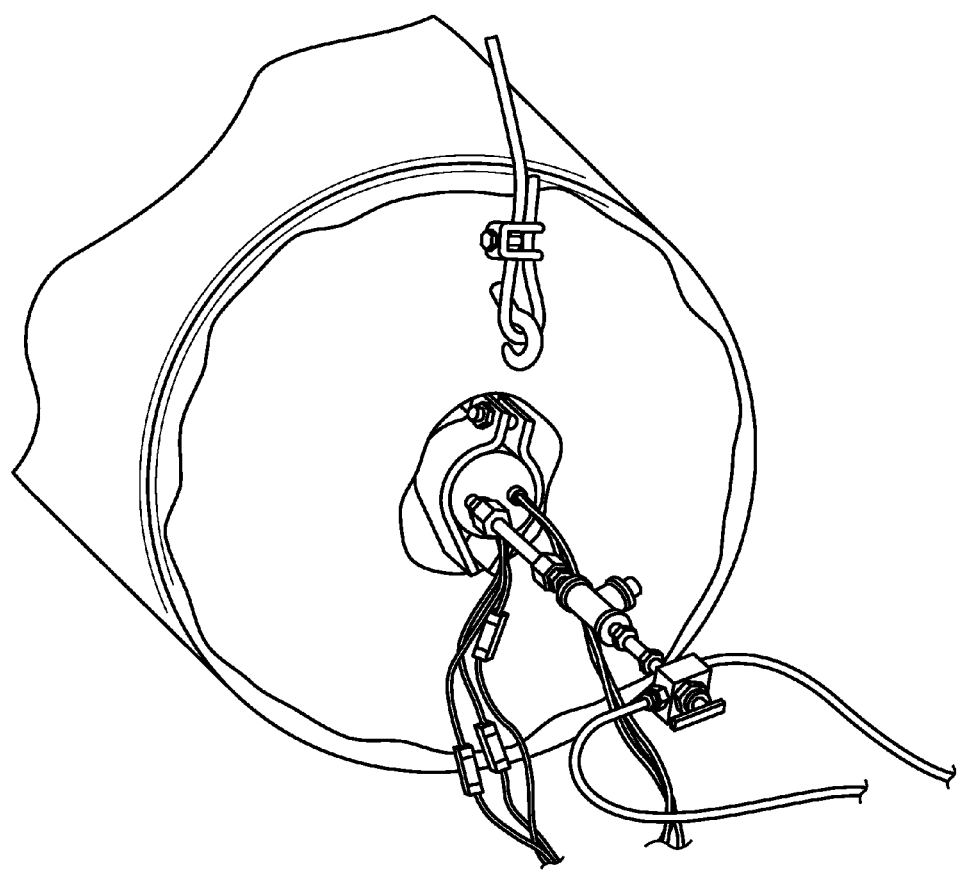
FIG. 14 is an image of the exterior of a drum reactor surrounded by a heating jacket, and showing several thermocouple connectors and a gas entry port.

FIG. 14 is an image of the exterior of a drum reactor surrounded by a heating jacket, and showing several thermocouple connectors and a gas entry port.

Figure 15:
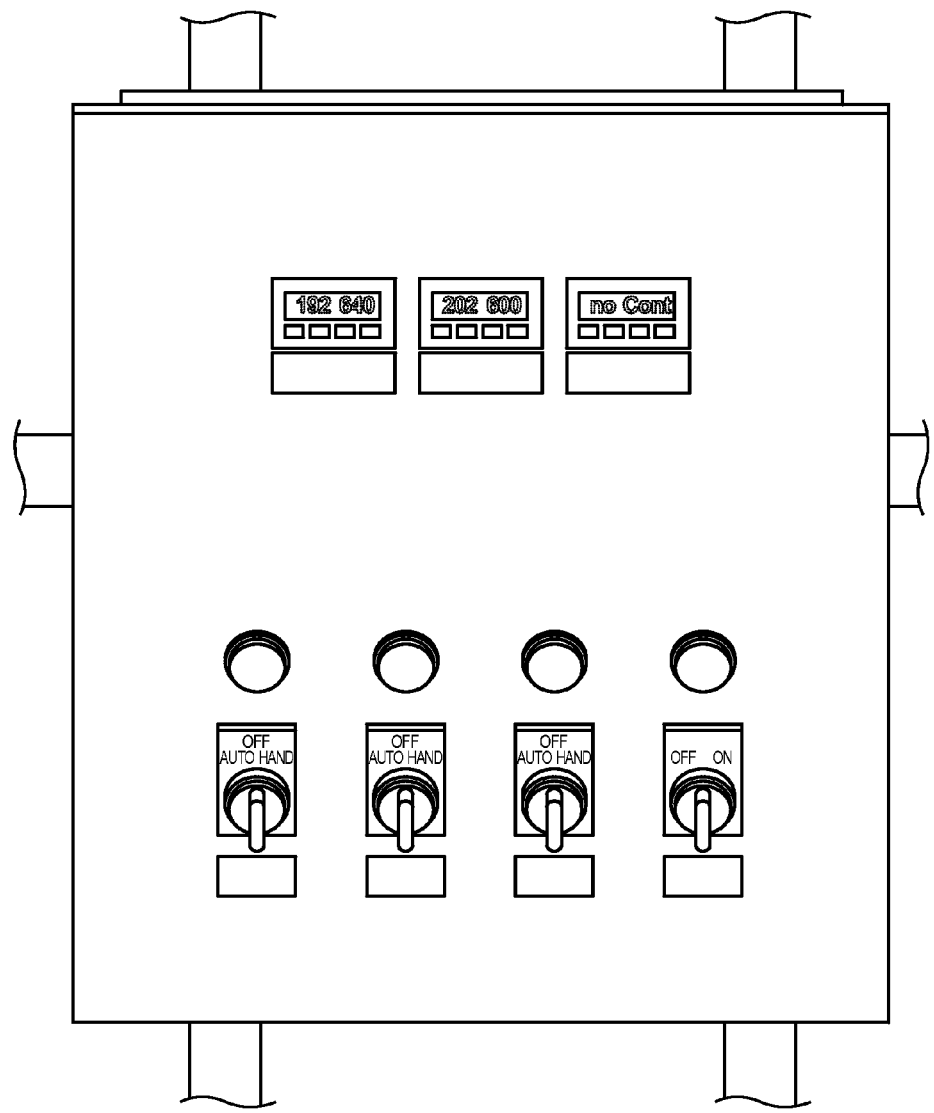
FIG. 15 is an image of a control panel for a drum reactor showing four controllers that control (from left to right) an immersion heater, a jacket heater, an inline gas heater, and a fan, with readouts for the temperatures of the three heaters.

FIG. 15 is an image of a control panel for a drum reactor showing four controllers that control (from left to right) an immersion heater, a jacket heater, an inline gas heater, and a fan, with readouts for the temperatures of the three heaters.

Figure 16:
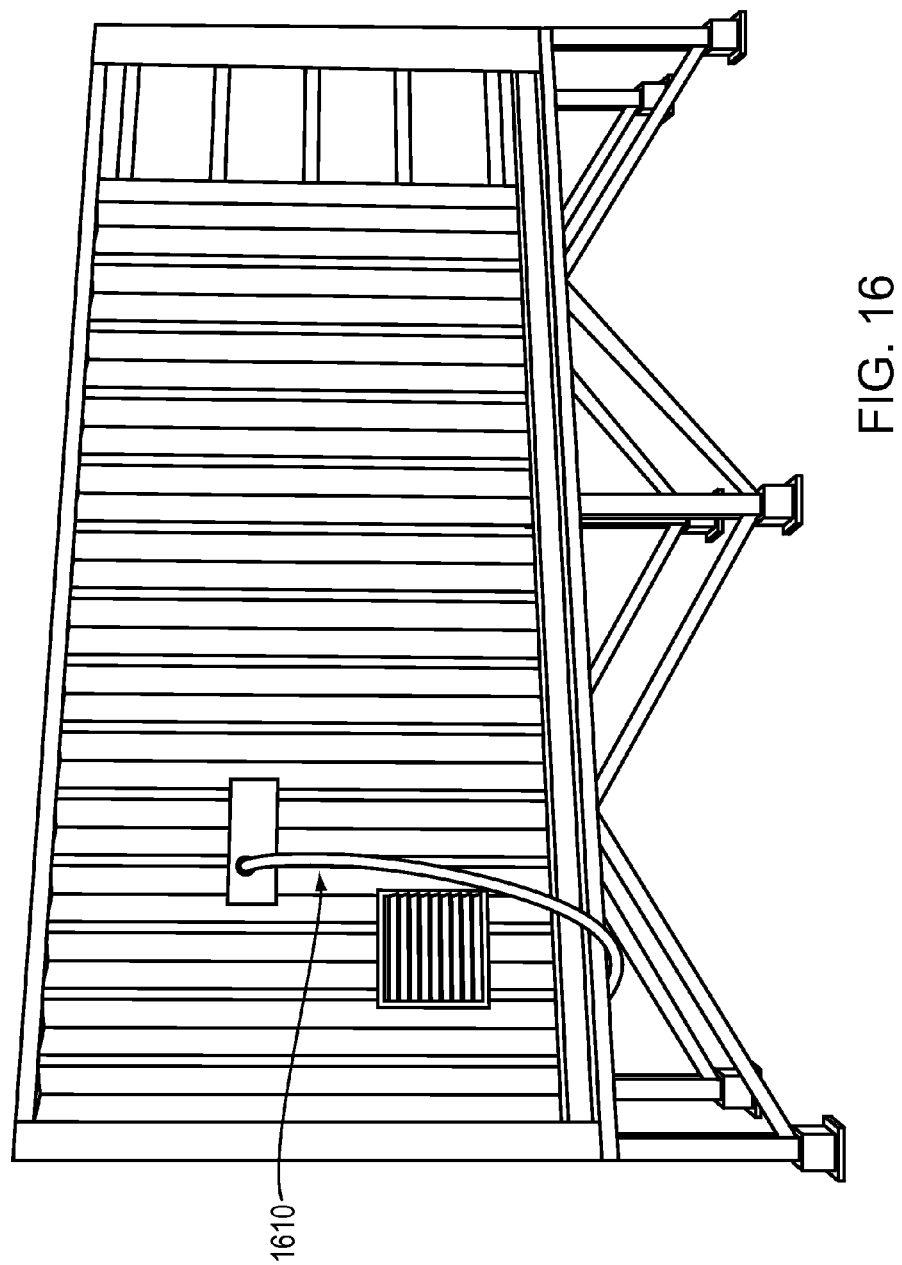
FIG. 16 is an image of a commercially available concrete curing chamber built by CDS Inc. which has been retrofitted for low pressure CO₂ curing according to principles of the invention.

FIG. 16 is an image of a commercially available CDS curing chamber (available from CDS Inc., Cinderhill Trading Estate, Weston Coyney Road, Longton, Stoke-on-Trent ST3 5JU, Great Britain) which has been retrofitted for low pressure $CO_2$ curing according to principles of the invention. In FIG. 16 a $CO_2$ inlet 1610 from a source of $CO_2$ such as a tank into the chamber has been added and is illustrated. This is an example of a $CO_2$ concentration regulated curing system called the Solidia Portable Shipping Container Reactor.

Figure 17:
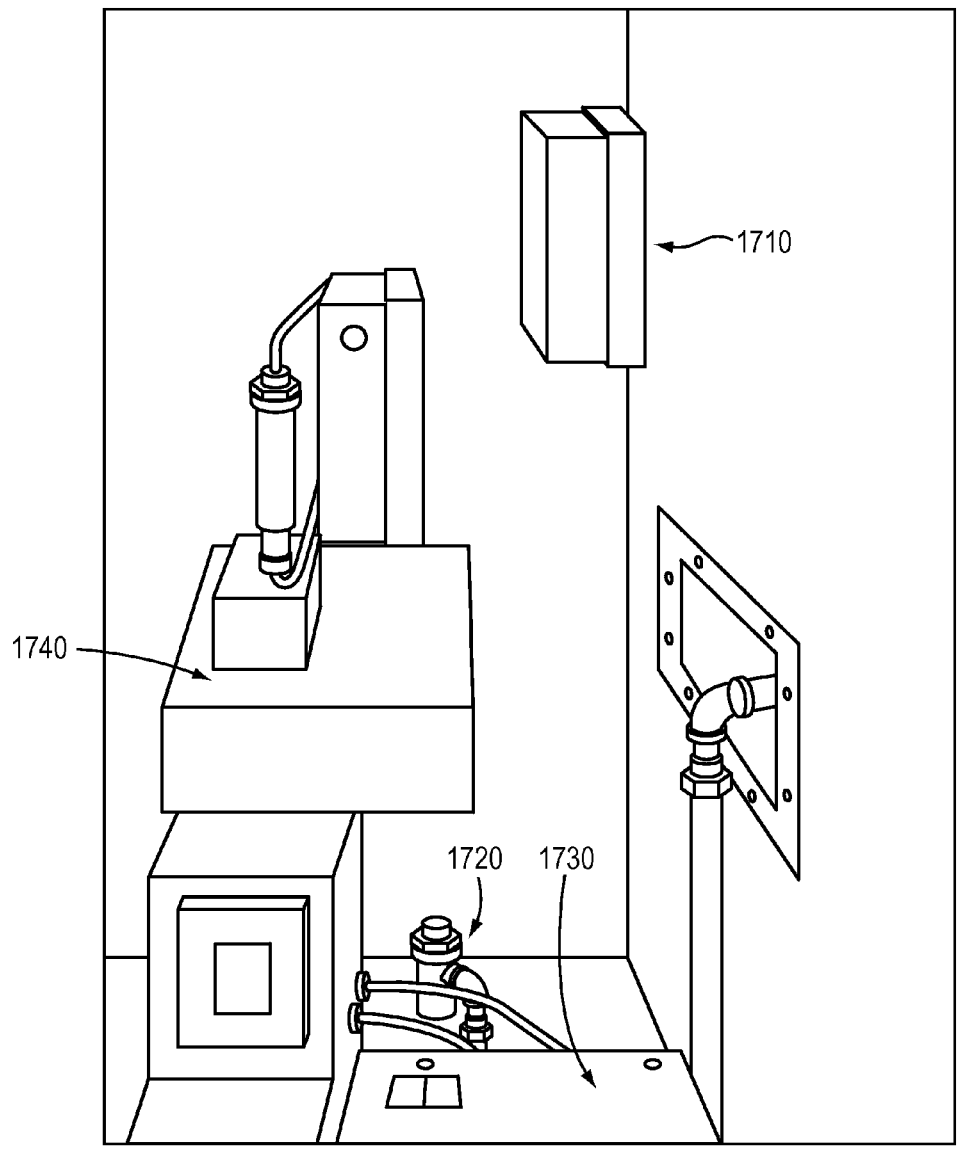
FIG. 17 is an image of a portion of the interior of the chamber of FIG. 16, showing further modifications made to the prior art Portland cement curing system.

FIG. 17 is an image of a portion of the interior of the chamber of FIG. 16, showing further modifications made to the prior art Portland cement curing system. A Dipole Polarization Moisture Volume Probe 1710 has been added. A commercially available $CO_2$ nondispersive infrared (NDIR) analyzer 1740 that permits the determination of the $CO_2$ concentration has been added (Siemens Ultramat 23, available from Siemens AG, One Internet Plaza, Johnson City, Tenn. 37604). A sample chiller 1730 has been added in the flow line that enters this analyzer. The sample chiller drops moisture out of the gas stream first so the sensor can read the $CO_2$ concentration with no interference from water vapor. The chiller 1730 can be used to condense water in the system and to dehumidify the gas stream that is provided to the system. A $CO_2$ proportioning control valve 1720 has been added, which is used to for ramp up the $CO_2$ concentration and then sustain the $CO_2$ levels throughout the course of the curing reaction.

Figure 18:
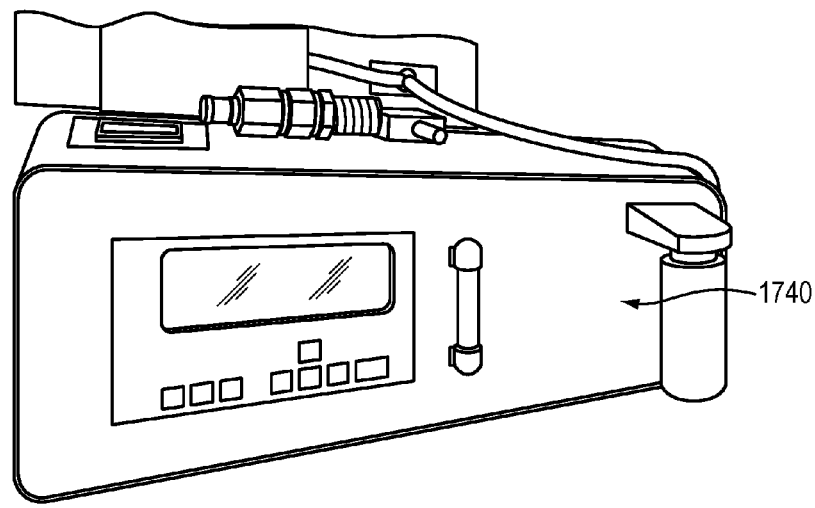
FIG. 18 is another view of the CO₂ NDIR analyzer 1740.

FIG. 18 is another view of the $CO_2$ NDIR analyzer 1740.

FIG. 19 is a view within the curing chamber that illustrates additional components that have been added. A dipole polarization gas sampler 1910 that is used to measure percent $H_2O$ by volume with extremely high accuracy has been added. A condensing coil 1920 is added in the suction side of the $CO_2$ return duct, before the circulating gas reaches a blower and a 50 kW electric heater. The water vapor recovered as liquid from the chiller inside the return duct is extracted by a condensate drain for dehumidification of the flowing $CO_2$ gas and can be measured via a flow meter to enable measurement of drying rate of specimens in the chamber. A dry bulb-wet bulb humidity measurement device 1930 was added, which is similar to a sling psychrometer in operation. The temperature differential between the wet bulb thermometer and the dry bulb thermometer provides a measure of the relative humidity. In one embodiment, a programmable logic controller (PLC) is programmed with instructions that provide a calculate relative humidity based on the thermal measurements, the psychrometric ratio of the gasses, and an equation that represents a steam in the range of temperature being utilized. The curing chamber is modified by providing an aperture 1940 through which gas is sampled at a rate of 1 L/min for analysis in the $CO_2$ NDIR analyzer 1740 (located outside the active portion of the curing chamber). In the example shown in FIG. 19, an inlet 1950 for the $CO_2$ gas coming from a proportioning valve is provided in the bottom of the curing chamber. In other embodiments, the inlet can be located on another face of the chamber, or multiple inlets could be used.

Figure 20:
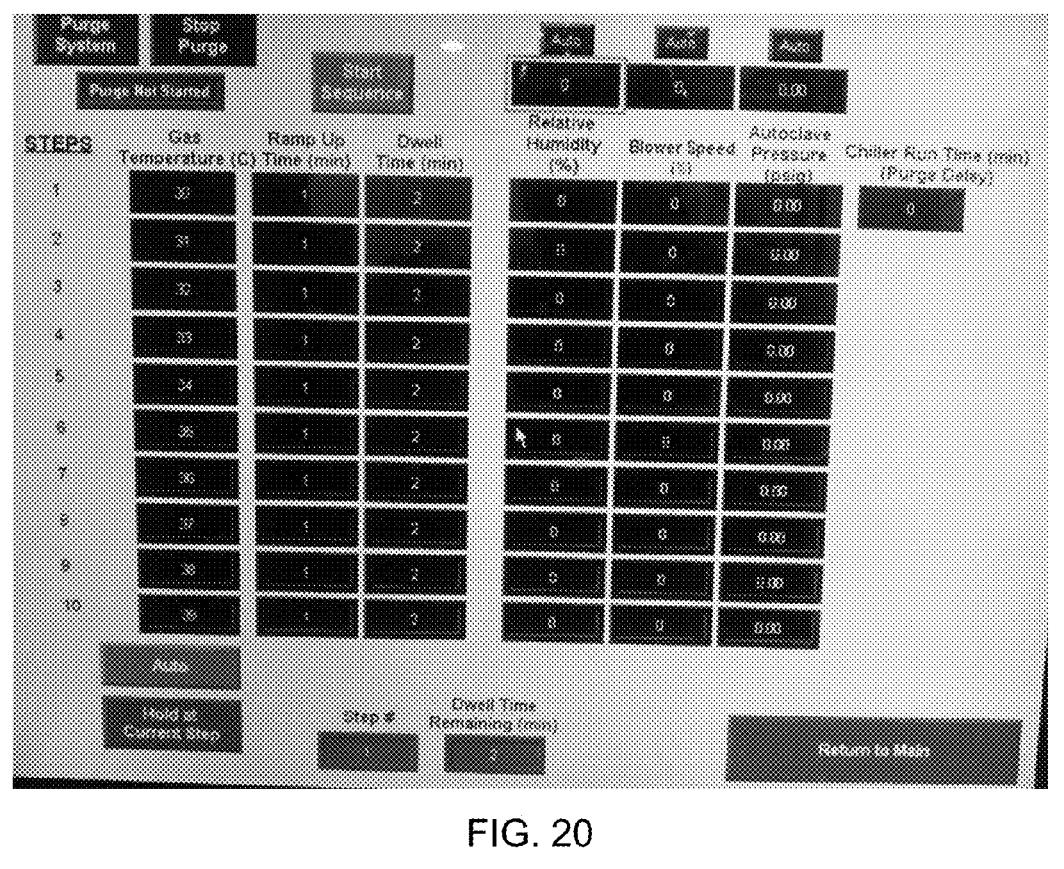

FIG. 20 is a screen shot of the display connected to a programmable logic controller or other control apparatus, such as a general purpose programmable computer that operates under the control of a set of instructions recorded on a machine-readable medium. In the embodiment shown, the curing chamber is a pressure vessel that is operated as an atmospheric pressure reactor, using approximately 0.25 PSIG overpressure of 50-99% pure $CO_2$ that is taken as boil-off from a vessel that contains liquid $CO_2$ at high pressure and the remainder mostly water vapor. The automated control system screen, which can be a touchscreen, shows a variety of controls and read outs of process variables such as time, temperature, relative humidity, pressure, gas flow rates and so forth. The automated control system provides control of the temperature and humidity profile in the presence of high $CO_2$ gas concentration. When the curing chamber is first loaded and started, a $CO_2$ purge system is used to bring in $CO_2$ over the course of 15 minutes, during which time the ambient air in the curing chamber is displaced by $CO_2$. The systems of the invention provide dynamic control in which temperature, humidity, $CO_2$ concentration, $CO_2$ flow rate, and system pressure are independently controlled throughout the cure cycle, and each can be varied so as to be increased or decreased independently or dependently of the changes in the other variables. The controller can record any of the data that it displays.

CURING METHOD EXAMPLES

Example 1

6-Inch by 9-Inch Pavers Cured in a Drum Reactor in a $CO_2$ Atmosphere with Self-Generated Humidity Raw Materials Synthetic Wollastonite (SC-C2), Donghai Golden Resources Industries, Donghai, China; ¼" trap rock aggregate from Stavola (NJ), construction sand from Bound Brook (NJ) and Glenium 7500 (BASF). Table 4 gives the mixture proportion of the raw material used to prepare the pavers.

TABLE 4

| Mixing Proportions (100 kg batch size) | | |
|---|---|---|
| Solid Components: | 94.3% | |
| Synthetic Wollastonite (SC-C2) | 18% | 17.1 kg |
| Construction sand | 55.2% | 52.2 kg |
| ¼" aggregate | 26.8% | 25 kg |
| Liquid Components: | 5.7% | |
| Tap Water | 98.81% | 5.632 kg |
| Glenium 7500 | 1.19% | 0.068 kg |

Mixing Procedure
1. Measure and load 25 kg of ¼" aggregate into a planetary mixer (Sicoma™ MP375/250).
2. Measure and load 55.2 kg of construction sand into the mixer.
3. Measure and load 17.1 kg of Synthetic Wollastonite (SC-C2) mixer.
4. Mix the solid components loaded into the mixer for approximately 3 minutes. This creates a dry mixture.
5. Measure and load the liquid component (5.632 kg of water and 0.068 kg of Glenium 7500 as in this example) into the mixer containing the dry mixture, and continue mixing for approximately for 2 minutes until uniform slurry is formed. This creates a wet mixture.

Pressing Procedure
1. The wet mixture is discharged into a hopper and conveyed to the paver forming machine (Columbia Model 1600)
2. The wet mixture is then discharged into the feed hopper of the paver forming machine
3. The wet mixture is then discharged from the feed hopper into the paver mold cavity. As the wet mixture is discharged into the paver mold cavity, the mold is vibrated so as to effectively fill the cavity.
4. The compression head of the paver press compresses the wet mixture for approximately 1.5 seconds or until the wet mixture reaches a height of 2⅝" inch. This creates a green ceramic body.
5. The green ceramic body in the shape of a paver is then stripped from the mold cavity.

Curing Procedure

Green ceramic bodies in the shape of pavers are cured in the drum reactor as follows. The 1.6 kW commercially available heating jacket in contact with the exterior of a 55 gallon stainless steel drum is heated up to a 110 degrees Celsius to preheat the shell for approximately twenty minutes. Green ceramic bodies are loaded onto aluminum sheets and placed into the shelving of system that contains a 373 CFM fan and a baffle system to direct the flow across the samples. The lid that contains a ½" diameter orifice is sealed around the drum via a compression gasket ring. The fan is started, and a flow ranging from 200-500 L/min of $CO_2$ is initiated, flowing through the system and exiting the ½" orifice on the lid. After fifteen minutes, the flow of $CO_2$ is stopped and the ½" orifice is plugged with a low pressure relief fitting, exhausting any pressure that exceeds ½ PSIG. The heating jacket is controlled to regulate an internal gas temperature of the system at 60 C. As pressure builds from expansion of gasses during heat up and water vapor pressure build up from evaporation of water in samples, the low pressure relief fitting will intermittently relieve pressure and exhaust some humid $CO_2$. An alternative CO2 line is opened that contains a low pressure regulator that regulated gas in the drum reactor to 0.33 PSIG. This regulator adds gas to the system if the pressure drops below 0.33 PSIG, which occurs once thermal equilibrium has been reached and $CO_2$ is being consumed in the reaction chamber. The relative humidity in the system is sustained at a relative high amount, in the area of 60-96%. After 20 hours, the flow of gas into the system is stopped and the lid is opened. The green ceramic bodies, now converted to cured pavers, are removed from the system and contain anywhere from 3-5% $CO_2$ by mass, and have compressive strengths in the range of 2,000-13,000 PSI as tested per the ASTM C 936.

Example 2

6-Inch by 9-Inch Pavers Cured in a Drum Reactor in a CO2 Atmosphere with Condensate Drainage for Dehumidification Green ceramic bodies in the shape of pavers are prepared in the same manner as Example 1.

Curing Procedure

The curing process described in Example 1 is carried out while utilizing a solenoid valve on a timer (opens for 5 seconds every 10 minutes) at the bottom of the drum reactor as to remove condensate on the bottom of the reactor and therefore reduce humidity in the system over the course of the cure cycle. A time is used such that the system stays sealed and only intermittently bleeds condensate without bleeding very much gas out of the system. Liquid drain traps may be used but can be challenging to use due to the low gas pressures involved. During this the relative humidity is maintained in the area of 37-67%. After 20 hours, the flow of gas into the system is stopped and the lid is opened. The cured pavers are removed from the system and contain anywhere from 3-5% $CO_2$ by mass, and have compressive strengths in the range of 2,000-13,000 PSI as tested per the ASTM C 936.

Example 3

6-Inch by 9-Inch Pavers Cured in a Drum Reactor in a CO2 Atmosphere with Added Humidity by Heating Water on the Bottom of the Chamber Green ceramic bodies in the shape of pavers are prepared in the same manner as Example 1.

The curing process described in Example 1 is carried out wherein the bottom of the drum reactor equipped with a 1 kW immersion heater located at the bottom of the drum. The drum is filled with approximately 3-5 gallons of water, enough to cover the 1 kW immersion heater. The lid that contains a ½" diameter orifice is sealed around the drum via a compression gasket ring. The fan is started, and a flow ranging from 200-500 L/min of $CO_2$ is initiated, flowing through the system and exiting the ½" orifice on the lid. After ten minutes, the flow of $CO_2$ is stopped and the ½" orifice is plugged with a low pressure relief fitting, exhausting any pressure that exceeds ½ PSIG. The heating jacket is controlled to regulate an internal gas temperature of the system at 60 C. To increase relative humidity in the system the power output to the immersion heater is controlled to heat the water to 64 C that is measured by a separate thermocouple immersed in the water. As pressure builds from expansion of gasses during heat up and water vapor pressure build up from evaporation of water in samples, the low pressure relief fitting will intermittently relieve pressure and exhaust some humid $CO_2$. An alternative CO2 line is opened that contains a low pressure regulator that regulated gas in the drum reactor to 0.33 PSIG. This regulator adds gas to the system if the pressure drops below 0.33 PSIG, which occurs once thermal equilibrium has been reached and $CO_2$ is being consumed in the reaction chamber. The relative humidity in the system is sustained at a very high amount, in the area of 83-99%. After 20 hours, the flow of gas into the system is stopped and the lid is opened. The pavers are removed from the system and contain anywhere from 3-5% $CO_2$ by mass, and have compressive strengths in the range of 5,000-13,000 PSI as tested per the ASTM C 936.

Example 4

6-Inch by 9-Inch Pavers Cured in a Drum Reactor in a CO2 Atmosphere with a Humidified Incoming $CO_2$ Stream by Bubbling the Gas Stream Through a Hot Water System Green ceramic bodies in the shape of pavers are prepared in the same manner as Example 1.
Curing Procedure
Samples are cured in a flow-through drum reactor as follows: The 1.6 kw commercially available heating jacket in contact with the exterior of a 55 gallon stainless steel drum is heated up to 110 Celsius to preheat the shell for approximately twenty minutes. Samples are loaded onto aluminum sheets and placed into the shelving system that contains a 373 CFM fan and a baffle system to direct the flow across the samples. The lid that contains a ½" diameter orifice is sealed around the drum via a compression gasket ring. For this experiment, a dilute $CO_2$ stream is created. A 99.9% industrial food grade $CO_2$ gas stream and compressed air are regulated using a mixing gas rotameter that allow the flow of each gas to be controlled and CO2 concentrations diluted down to the range of 25-40% with a total flow rate ranging between 20-50 L/min. A commercially available 1.1 kw heated steamer pressure vessel (pressure cooker) is filled with water and connected to the $CO_2$ inlet. The gas stream is bubbled through the regulated 75 C hot water and into the drum reactor, providing a highly humidified gas stream. The water temperature may be controlled to adjust the humidity. The lines running from hot steamer to the drum reactor are insulated as to prevent condensation and may also be heat traced for an even higher humidity. The fan is started and a flow is started through the system, exiting the ½" orifice on the lid. A constant exhaust of this humid gas mixture exits the systems via the ½" orifice on the front cover over the course of the curing cycle. The heating jacket is controlled to regulate an internal gas temperature of the system at 60 C and keep the walls of systems warm as to prevent condensation of the incoming humidified gas stream. The relative humidity of the system is sustained at a relatively high amount, in the area of 92-98%. After 20 hours, the flow of gas into the system is stopped and the lid is opened.

Example 5

Lightweight Block with 18% Ground Calcium Silicate Cured in an Autoclave at Atmospheric Pressure in a $CO_2$ Atmosphere Utilizing a Chiller to Reduce Humidity Raw Materials
Synthetic Wollastonite (SC-C2), Donghai Golden Resources Industries, Donghai, China; ½" trap rock aggregate from Stavola (N.J.), construction sand from Bound Brook (N.J.), Bottom ash from Austral Masonry (Australia), crusher dust from Austral Masonry (Australia), Sika Viscocrete (Sika) and Glenium 7500 (BASF). Table 5 shows the mixture proportion of the raw material used to prepare the pavers.

TABLE 5

| Mixing Proportions (100 kg batch size) | | |
|---|---|---|
| Solid Components | 92.61% | |
| Synthetic Wollastonite (SC-C2) | 18% | 16.67 kg |
| Construction Sand | 25.20% | 23.33 kg |
| ¼" Aggregate | 16.10% | 14.91 kg |
| Bottom ash | 19.50% | 18.06 kg |
| Crusher Dust | 21.20% | 19.63 kg |
| Liquid Components | 7.31% | |
| Tap Water | 99.30% | 7.26 kg |
| Glenium 7500 | 0.30% | 0.02 kg |
| Sika Viscocrete | 0.40% | 0.03 kg |

Mixing Procedure
1. Measure and load 23.33 kg of construction sand into a planetary mixer (Sicoma™ MP375/250).
2. Measure and load 14.91 kg of ½" aggregate into the mixer.
3. Measure and load 18.06 kg of bottom ash into the mixer
4. Measure and load 19.63 kg of crusher dust into the mixer
5. Measure and load 16.67 kg of Synthetic Wollastonite (SC-C2) mixer.
6. Mix the solid components loaded into the mixer for approximately 3 minutes. This creates a dry mixture.
7. Measure and load the liquid component (7.26 kg of water, 0.02 kg of Glenium 7500 and 0.068 kg of Glenium 7500 as in this example) into the mixer containing the dry mixture, and continue mixing for approximately for 2 minutes until uniform slurry is formed. This creates a wet mixture.

Pressing Procedure
1. The wet mixture is discharged into a hopper and conveyed to the paver forming machine (Columbia Model 1600)
2. The wet mixture is then discharged into the feed hopper of the paver forming machine
3. The wet mixture is then discharged from the feed hopper into the paver mold cavity. As the wet mixture is discharged into the paver mold cavity, the mold is vibrated so as to effectively fill the cavity.

4. The compression head of the paver press compresses the wet mixture for approximately 1.5 seconds or until the wet mixture reaches a height of 2⅝" inch. This creates a green ceramic body.
5. The green ceramic body in the shape of a block is then stripped from the mold cavity.

Curing Procedure

Green ceramic bodies in the shape of blocks are formed 3 at a time per board. Each board is placed on an aluminum cart and transferred inside of a 7 ft diameter, 12 ft long, horizontal, autoclave, which had been pre-heated to 60° C. via an indirect steam heat exchanger coil with 140 PSI of steam pressure. The autoclave was then purged with $CO_2$ gas heated to 75° C. by keeping the top gas vent open while running a 7.5 horsepower blower at 3600 RPM's while flowing 60 PSI of CO2 gas pressure from a liquid CO2 holding tank into the chamber. The purge is conducted for 12 minutes to reach a CO2 concentration of 97% by volume. The bleed-valve at the top of the autoclave was then closed, and the $CO_2$ pressure within the autoclave was regulated to 0 psig and temperature of the gas maintained at 60 C. In this embodiment the relative humidity is not precisely controlled but is adjusted manually. For the first 5 hours of the profile, a high surface area heat exchanger chilled to 4 C with an Ethylene Glycol/Water mixture via a 10 kW chiller is exposed to the gas stream allowing the chamber atmosphere to be dehumidified for this duration. The condensate water formed on the chiller is dripped down and dropped out of the reactor via a commercially available Armstrong Liquid Drain Trap. After 5 hours the chiller is turned off and the humidity in the system begins to rise and sustain within a range of 60 and 55%. At the end of the 20 hour curing cycle fresh ambient air is brought into the curing system via a pump and displaces the CO2 from the curing chamber for safe opening of the chamber door. Upon completion of the curing cycle some amount of condensed water from had accumulated at the bottom of the system, accounting or a majority of the water lost from the blocks.

Figure 21:
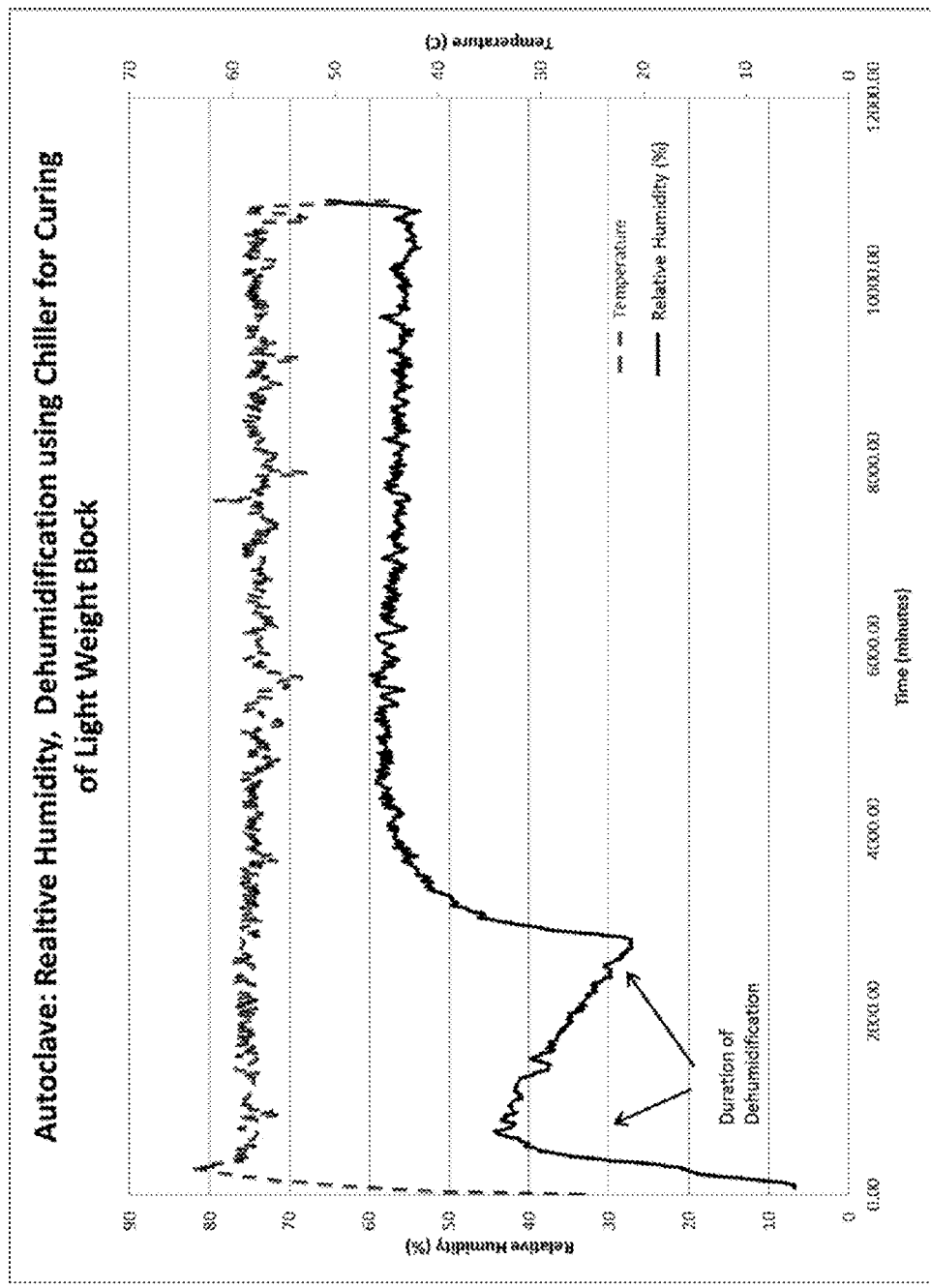
FIG. 21 is the corresponding temperature and humidity profile for the example 5.

FIG. 21 is the corresponding temperature and humidity profile for the example 5.

Example 6

Normal Weight Block Cured in Autoclave at Atmospheric Pressure in a $CO_2$ Atmosphere Utilizing Self-Generated Humidity Raw Materials:

Synthetic Wollastonite (SC-C2), Donghai Golden Resources Industries, Donghai, China; ¼" trap rock aggregate from Stavola (NJ), construction sand from Bound Brook (N.J.) and Glenium 7500 (BASF). Table 6 shows the mixing proportion of the raw material used for this example.

TABLE 6

Mixing Proportions (100 kg batch size)

| Solid Components: | 93.9% | |
|---|---|---|
| Synthetic Wollastonite (SC-C2) | 18% | 16.902 kg |
| Construction Sand | 55.2% | 51.832 kg |
| ¼" Aggregate | 26.8% | 25.165 kg |
| Liquid Components: | 6.1% | |
| Tap Water | 98.81% | 6.02 kg |
| Glenium 7500 | 1.19% | 0.08 kg |

Mixing Procedure

The mixing procedure is similar to the procedure adopted for pressed pavers as described in Example 1.

Pressing Procedure

Similar procedure was used to press blocks as mentioned in Example 1 for pressed pavers with an exception in the mold geometry to form the green ceramic body. The dimension of the pressed blocks were 7⅝"×7⅝"×15⅝" (49% of volume being solid).

Curing Procedure

Green ceramic bodies in the form of blocks are formed 3 at a time per board. Each board is placed on an aluminum cart and transferred inside of a 7 ft diameter, 12 ft long, horizontal, autoclave, which had been pre-heated to 60° C. via an indirect steam heat exchanger coil with 140 PSI of steam pressure. The autoclave was then purged with $CO_2$ gas heated to 75° C. by keeping the top gas vent open while running a 7.5 horsepower blower at 3600 RPM's while flowing 60 PSI of CO2 gas pressure from a liquid CO2 holding tank into the chamber. The purge is conducted for 12 minutes to reach a CO2 concentration of 97% by volume. The bleed-valve at the top of the autoclave was then closed, and the $CO_2$ pressure within the autoclave was regulated to 0 psig and temperature of the gas maintained at 60 C. Over the course of the 8 hour curing cycle, the relative humidity naturally increases up to approximately 70% due evaporation of water from the samples and tend to slowly taper off to approximately 65% due to condensation in the system. At the end of the 8 hour curing cycle fresh ambient air is brought into the curing system via a pump and displaces the CO2 from the curing chamber for safe opening of the chamber door. Upon completion of the curing cycle some amount of condensed water from had accumulated at the bottom of the system, accounting or a majority of the water lost from the blocks.

Figure 22:
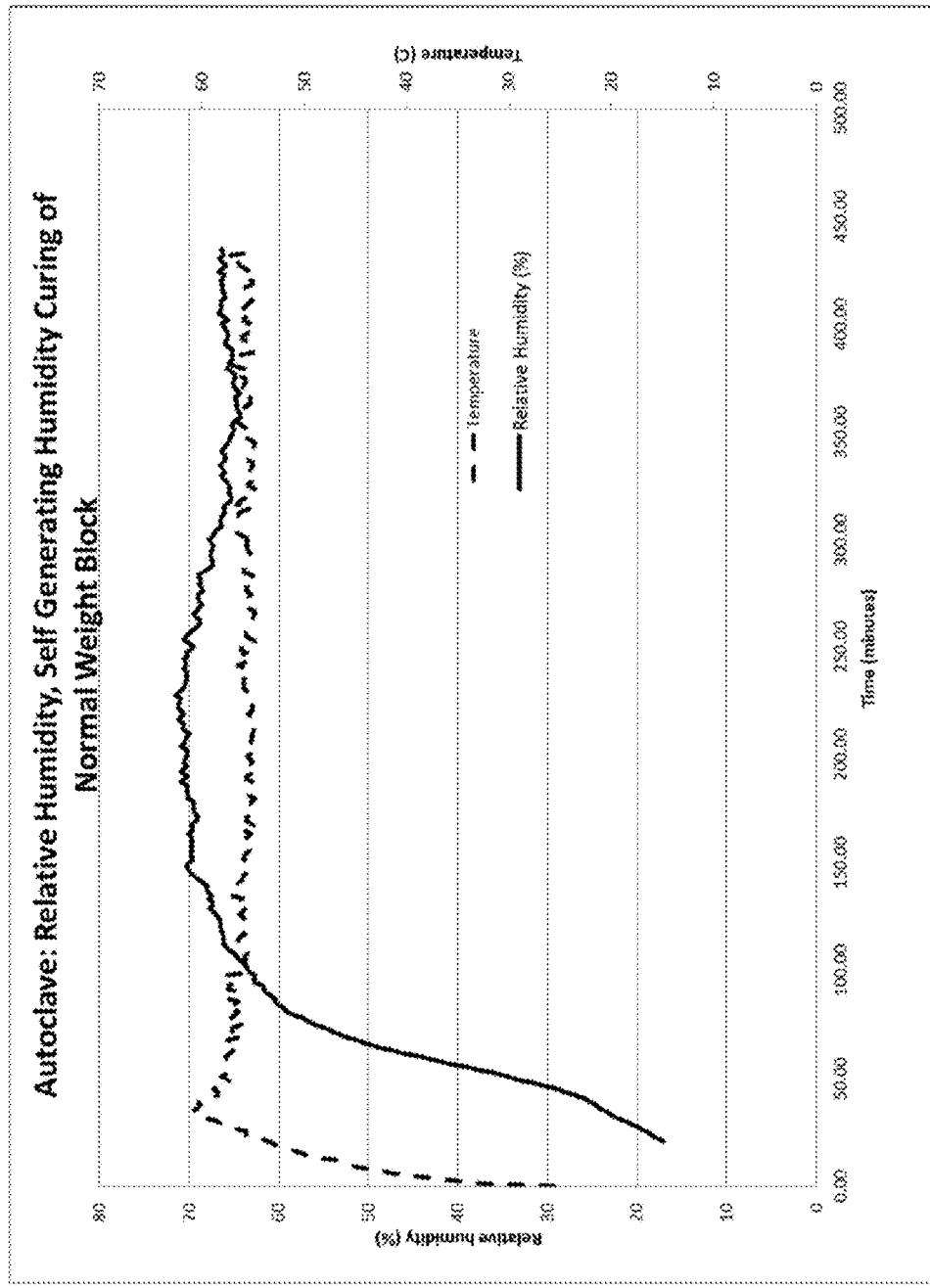
FIG. 22 is the corresponding temperature and humidity profile for the example 6.

FIG. 22 is the corresponding temperature and humidity profile for the example 6.

Testing

The cured ceramic body in form of pressed block was tested for unconfined compressive strength as per ASTM C90. The compressive strength of the blocks prepared was 17.2 MPa (2500 psi).

DEFINITIONS

As used herein, the terms "chemical reagent," "reagent," "reactant," and "chemical reactant" are all intended to be synonymous, and are used to refer to a chemical species that reacts with another chemical species.

Recording the results from an operation or data acquisition, such as for example, recording results at a particular time or under particular operating conditions, is understood to mean and is defined herein as writing output data in a non-volatile manner to a storage element, to a machine-readable storage medium, or to a storage device. Non-volatile machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-volatile record or a non-volatile recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature cited herein. The examples contain important additional information, exemplification and guidance that can be adapted to the practice of this invention in its various embodiments and equivalents thereof.

What is claimed is:

1. A curing system for curing a material which requires $CO_2$ as a curing reagent, comprising:
   a curing chamber configured to contain a material that consumes $CO_2$ as a reagent and that does not cure in the absence of $CO_2$ during curing, said curing chamber having at least one port configured to allow said material to be introduced into said curing chamber and to be removed from said curing chamber, and having at least one closure for said port, said closure configured to provide an atmospheric seal when closed so as to prevent contamination of a gas present in said curing chamber by gas outside said curing chamber;
   a source of carbon dioxide configured to provide gaseous carbon dioxide to said curing chamber by way of a gas entry port in said curing chamber, said source of carbon dioxide having at least one flow regulation device configured to control a flow rate of said gaseous carbon dioxide into said curing chamber;
   a gas flow subsystem configured to circulate said gas through said curing chamber during a time period when said material that consumes $CO_2$ as a reagent is being cured;

a temperature control subsystem configured to control a temperature of said gas within said chamber;

a humidity control subsystem configured to control a humidity in said gas within said chamber; and at least one controller in communication with at least one of said source of carbon dioxide, said gas flow subsystem, said temperature control subsystem, and said humidity control subsystem, said at least one controller configured to control independently during a time period when said material that consumes $CO_2$ as a reagent is being cured at least a respective one of said flow rate of said gaseous carbon dioxide, said circulation of said gas through said curing chamber, said temperature of said gas, and said humidity in said gas.

2. The curing system of claim 1, wherein said curing chamber is configured to contain a pressure of gas therein that is above atmospheric pressure.

3. The curing system of claim 1, wherein said at least one flow regulation device comprises at least one of a pressure regulator and a flow controller configured to supply carbon dioxide gas at a rate substantially equal to a rate of consumption of said carbon dioxide by said material that consumes $CO_2$ as a reagent during curing.

4. The curing system of claim 1, wherein said at least one flow regulation device comprises at least one of a pressure regulator and a flow controller configured to supply carbon dioxide gas at a rate sufficient to purge ambient atmosphere from said curing chamber in a time period between 2-120 minutes to achieve a target $CO_2$ concentration in a range of 50-90% by volume.

5. The curing system of claim 1, wherein said at least one flow regulation device comprises at least one of a pressure regulator and a flow controller configured to supply carbon dioxide gas at a rate substantially equal to a rate of venting of said gas from said curing chamber.

6. The curing system of claim 1, wherein said gas flow subsystem includes a measurement apparatus configured to measure an amount of carbon dioxide in said gas present in said curing chamber.

7. The curing system of claim 1, wherein said gas flow subsystem includes a measurement apparatus configured to measure a gas velocity of said gas present in said curing chamber.

8. The curing system of claim 7, wherein said measurement apparatus configured to measure a gas velocity is a selected one of a pitot tube, an orifice plate, an anemometer, and a laser Doppler detection system.

9. The curing system of claim 1, wherein said gas flow subsystem includes a variable speed blower configured to circulate gas at a desired velocity in said curing chamber.

10. The curing system of claim 1, wherein said temperature control subsystem includes a temperature sensor configured to measure said temperature of said gas in said curing chamber.

11. The curing system of claim 1, wherein said temperature control subsystem includes a heat exchanger to regulate said temperature of said gas in said curing chamber.

12. The curing system of claim 1, wherein said temperature control subsystem includes a heat exchanger to control a temperature of said gaseous carbon dioxide provided to said curing chamber by way of said gas entry port in said curing chamber.

13. The curing system of claim 1, wherein said temperature control subsystem includes a heater situated on an external surface or built into walls of said curing chamber.

14. The curing system of claim 1, wherein said humidity control subsystem includes a measurement apparatus configured to determine a relative humidity of said gas within said chamber.

15. The curing system of claim 1, wherein said humidity control subsystem includes a condenser configured to reduce said humidity in said gas within said chamber.

16. The curing system of claim 1, wherein said humidity control subsystem includes an exhaust valve configured to reduce said humidity in said gas within said chamber.

17. The curing system of claim 1, wherein said humidity control subsystem includes a water supply configured to increase said humidity in said gas within said chamber.

18. The curing system of claim 1, wherein said at least one controller is a selected one of a programmable logic controller, a controller having a touch screen display, and a general purpose programmable computer that operates under the control of a set of instructions recorded on a machine-readable medium.

19. The curing system of claim 1, wherein said at least one controller includes a display configured to display to a user any of a duration of a curing cycle, said flow rate of said gaseous carbon dioxide, a concentration of carbon dioxide in said curing chamber, a rate of circulation of said gas through said curing chamber, said temperature of said gas, and said humidity in said gas.

20. The curing system of claim 1, wherein said at least one controller is configured to record any of a duration of a curing cycle, said flow rate of said gaseous carbon dioxide, a concentration of carbon dioxide in said curing chamber, a rate of circulation of said gas through said curing chamber, said temperature of said gas, and said humidity in said gas.

* * * * *